(12) United States Patent
Pickens

(10) Patent No.: US 9,260,329 B2
(45) Date of Patent: Feb. 16, 2016

(54) CHEMICAL FEEDER

(71) Applicant: Axiall Ohio, Inc., Atlanta, GA (US)

(72) Inventor: Stanley R. Pickens, Monroeville, PA (US)

(73) Assignee: AXIALL OHIO, INC., Atlanta, GA (US)

( * ) Notice: Subject to any disclaimer, the term of this patent is extended or adjusted under 35 U.S.C. 154(b) by 0 days.

(21) Appl. No.: 14/524,061

(22) Filed: Oct. 27, 2014

(65) Prior Publication Data

US 2015/0129475 A1   May 14, 2015

Related U.S. Application Data

(60) Provisional application No. 61/903,533, filed on Nov. 13, 2013, provisional application No. 61/926,433, filed on Jan. 13, 2014.

(51) Int. Cl.

| | |
|---|---|
| *B65G 59/00* | (2006.01) |
| *B67D 5/56* | (2006.01) |
| *B08B 3/00* | (2006.01) |
| *C02F 1/68* | (2006.01) |
| *B01D 11/02* | (2006.01) |
| *B01F 1/00* | (2006.01) |
| *B01F 15/02* | (2006.01) |
| *B01J 4/00* | (2006.01) |
| *C02F 103/42* | (2006.01) |

(52) U.S. Cl.
CPC .............. *C02F 1/688* (2013.01); *B01F 1/0027* (2013.01); *B01F 15/0254* (2013.01); *B01J 4/001* (2013.01); *C02F 1/68* (2013.01); *B01F 2215/0052* (2013.01); *B01J 2219/00761* (2013.01); *C02F 2103/42* (2013.01); *C02F 2303/04* (2013.01)

(58) Field of Classification Search
CPC ....... A61L 2/00; B01F 1/0027; B01F 5/0496; B01F 15/00344; C02F 1/688; C02F 2103/42
USPC ....... 137/268; 222/129, 478; 221/92; 134/43, 134/84, 93; 422/261, 265, 275, 277; 210/748.16, 749
See application file for complete search history.

(56) References Cited

U.S. PATENT DOCUMENTS

| | | |
|---|---|---|
| 2,820,701 A | 1/1958 | Leslie |
| 5,089,127 A | 2/1992 | Junker et al. |
| 5,384,102 A | 1/1995 | Ferguson et al. |
| 5,427,748 A | 6/1995 | Wiedrich et al. |
| 5,441,073 A | 8/1995 | Hoadley |
| 5,810,043 A | 9/1998 | Grenier |
| 6,138,703 A | 10/2000 | Ferguson et al. |

(Continued)

*Primary Examiner* — Monzer R Chorbaji
(74) *Attorney, Agent, or Firm* — The Webb Law Firm

(57) ABSTRACT

The present invention relates to a chemical feeder that includes a support plate that is positioned within the housing chamber of the chemical feeder, in which one or more extensions extend upward from an upper surface of the base plate of the support plate. The extensions can, with some embodiments, be in the form of peg extensions, arcuate extensions that can together define an impeller pattern, or a spiral extension. A distributor head having a plurality of distributor head apertures and at least one dome hole extends up through a support plate aperture in the base plate of the support plate, and distributes liquid horizontally and vertically relative to the base plate. The horizontally and vertically distributed liquid contacts a solid chemical material that is supported above the support plate, so as to form a treated liquid that includes dissolved chemical material.

43 Claims, 11 Drawing Sheets

(56) References Cited

U.S. PATENT DOCUMENTS

| | | |
|---|---|---|
| 6,298,871 B1 | 10/2001 | Pickens et al. |
| 6,517,727 B2 | 2/2003 | Pickens et al. |
| 6,544,487 B1 | 4/2003 | Ferguson et al. |
| 7,081,232 B1 | 7/2006 | Dooley, Jr. et al. |
| 7,604,018 B2 * | 10/2009 | King .................... B01F 1/0033 137/1 |
| 2005/0150823 A1 | 7/2005 | Eserkaln et al. |
| 2010/0012560 A1 | 1/2010 | Sims et al. |

* cited by examiner

CHEMICAL FEEDER

CROSS REFERENCE TO RELATED APPLICATION

The present application is entitled to and claims priority to U.S. Provisional Patent Application No. 61/903,533, filed on Nov. 13, 2013, and U.S. Provisional Patent Application No. 61/926,433, filed on Jan. 13, 2014, the disclosures of which are each incorporated herein by reference in their entirety.

FIELD

The present invention relates to a chemical feeder that includes a support plate having raised extensions that extend upward from the upper surface of the base plate of the support plate, and a distributor head of a nozzle that extends up through a support plate aperture of the base plate.

BACKGROUND

Chemical feeders can be used to produce various mixtures, such as aqueous solutions of water treating agents that can be used for the disinfection of effluent from sewage treatment plants, for the chlorination of water in swimming pools and hot tubs, and for the delivery of other water soluble chemicals to aqueous streams and water systems. In some instances, a solid treatment chemical is placed within the chemical feeder, where it comes into contact with a liquid, such as water, introduced therein so as to form a treated liquid composition, such as a treated aqueous composition. It is typically desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of sanitizing treatment chemicals, for example, such variability in the concentration of the sanitizing chemical(s) can result in reduced sanitizing properties, when the concentration drops below a minimum threshold, or toxicity, when the concentration rises above a maximum threshold.

It would be desirable to develop new chemical feeders, such as but not limited to erosion chemical feeders and flow-through chemical feeders, that can be used to produce treated liquid compositions from solid treatment chemicals. It would be further desirable that such newly developed chemical feeders provide a controllable, reliable, and reproducible level of treatment chemical in the treated liquid compositions that are removed from the chemical feeder.

SUMMARY

In accordance with the present invention, there is provided, a chemical feeder comprising: (a) a housing having a housing base and at least one housing sidewall that together define a housing chamber within the housing; and (b) a support plate comprising a base plate having an upper surface and a lower surface, the support plate residing within the housing chamber and being positioned above an inner surface of the housing base, the support plate being adapted to support a solid chemical material above the upper surface of the base plate. The support plate comprises: (i) a support plate aperture extending from the lower surface to the upper surface of the base plate; and (ii) a plurality of extensions extending upward from the upper surface of the base plate, each extension being a peg extension. The chemical feeder further comprises: (c) at least one inlet in the housing through which liquid is introduced into the housing; (d) a nozzle that is in fluid communication with the inlet, the nozzle comprising a distributor head comprising at least one distributor head sidewall and a dome having at least one dome hole, the distributor head sidewall comprising a plurality of distributor head apertures; and (e) at least one outlet in the housing through which a treated liquid comprising dissolved chemical material is removed from the housing. The distributor head extends through the support plate aperture, the distributor head apertures being positioned above the upper surface of the base plate, the distributor head distributing a first portion of liquid passing through the distributor head horizontally (or laterally) through the distributor head apertures, and the distributor head distributing a second portion of liquid passing through the distributor head vertically through the dome hole.

In accordance with the present invention, there is further provided, a chemical feeder comprising: (a) a housing having a housing base and at least one housing sidewall that together define a housing chamber within the housing; and (b) a support plate comprising a base plate having an upper surface and a lower surface, the support plate residing within the housing chamber and being positioned above an inner surface of the housing base, the support plate being adapted to support a solid chemical material above the upper surface of the base plate. The support plate comprises: (i) a support plate aperture extending from the lower surface to the upper surface of the base plate; and (ii) a plurality of arcuate extensions extending upward from said upper surface of said base plate. The chemical feeder further comprises: (c) at least one inlet in the housing through which liquid is introduced into the housing; (d) a nozzle that is in fluid communication with the inlet, the nozzle comprising a distributor head comprising at least one distributor head sidewall and a dome having at least one dome hole, the distributor head sidewall comprising a plurality of distributor head apertures; and (e) at least one outlet in the housing through which a treated liquid comprising dissolved chemical material is removed from the housing. The distributor head extends through the support plate aperture, the distributor head apertures being positioned above the upper surface of the base plate, the distributor head distributing a first portion of liquid passing through the distributor head horizontally (or laterally) through the distributor head apertures, and the distributor head distributing a second portion of liquid passing through the distributor head vertically through the dome hole.

In accordance with the present invention, there is additionally provided, a chemical feeder comprising: (a) a housing having a housing base and at least one housing sidewall that together define a housing chamber within the housing; and (b) a support plate comprising a base plate having an upper surface and a lower surface, the support plate residing within the housing chamber and being positioned above an inner surface of the housing base, the support plate being adapted to support a solid chemical material above the upper surface of the base plate. The support plate comprises: (i) a support plate aperture extending from the lower surface to the upper surface of the base plate; and a spiral extension extending upward from said upper surface of said base plate, said spiral extension extending spirally outward relative to said support plate aperture, and said spiral extension defining a spiral channel. The chemical feeder further comprises: (c) at least one inlet in the housing through which liquid is introduced into the housing; (d) a nozzle that is in fluid communication with the inlet, the nozzle comprising a distributor head comprising at least one distributor head sidewall and a dome having at least one dome hole, the distributor head sidewall comprising a plurality of distributor head apertures; and (e) at least one outlet in the housing through which a treated liquid comprising dissolved chemical material is removed from the housing. The distributor head extends through the support plate aperture, the distributor head apertures being positioned above the upper surface of the base plate, the distributor head distributing a first portion of liquid passing through the distributor head horizontally (or laterally) through the distributor head apertures, and the distributor head distributing a second portion of liquid passing through the distributor head vertically through the dome hole.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1A through 9 like characters refer to the same components and/or streams, such as liquid streams, as the case may be, unless otherwise stated.

DETAILED DESCRIPTION

Figure 1A:
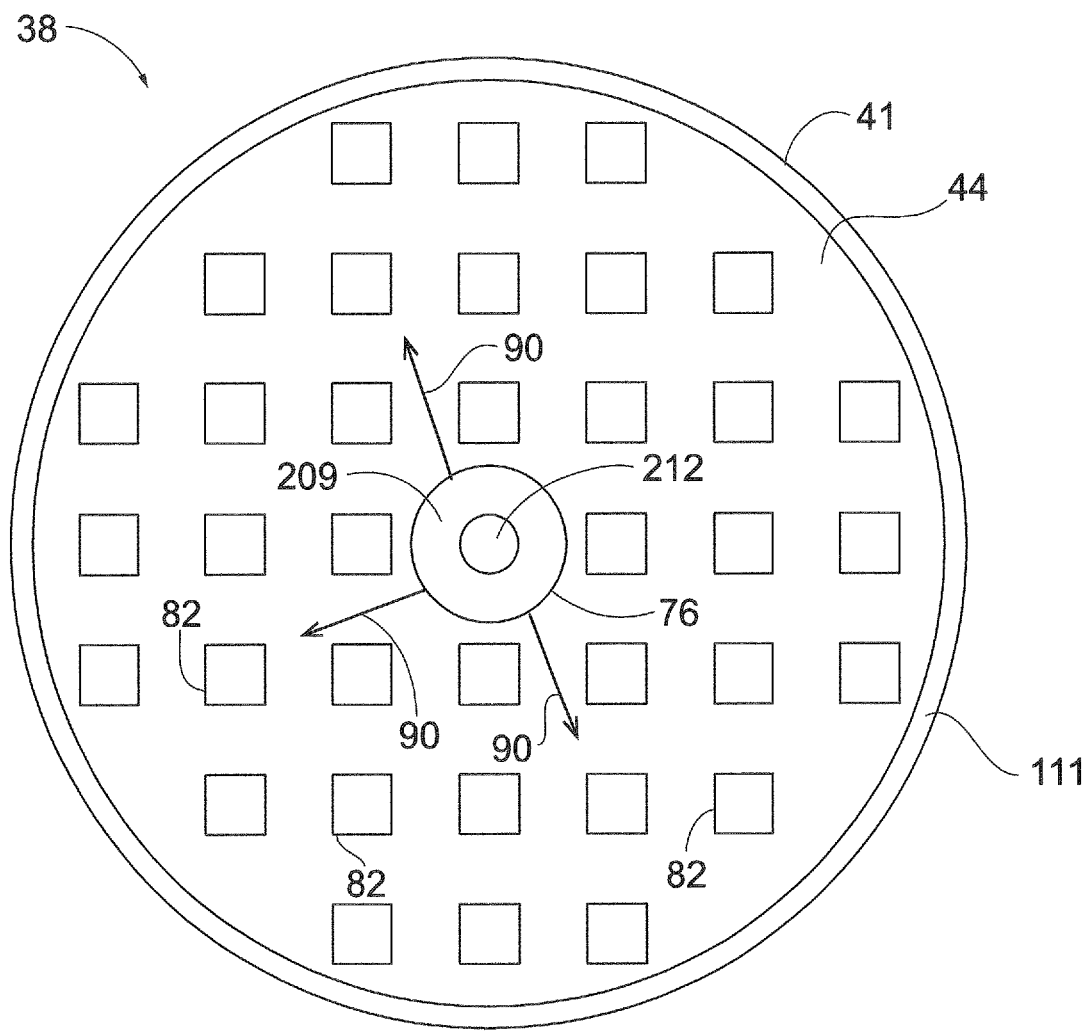
FIG. 1A is a representative top plan view of a support plate in accordance with some embodiments of the present invention, which has a plurality of peg extensions, and a distributor head extending upward through the support plate aperture thereof.

As used herein, the singular articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, flow rates, pressures, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, spatial or directional terms, such as "left", "right", "inner", "outer", "above", "below", "vertically", "upward", and the like, relate to embodiments of the invention as depicted in the drawing figures. However, it is to be understood that the invention can assume various alternative orientations and, accordingly, such terms are not to be considered as limiting.

Figure 5:
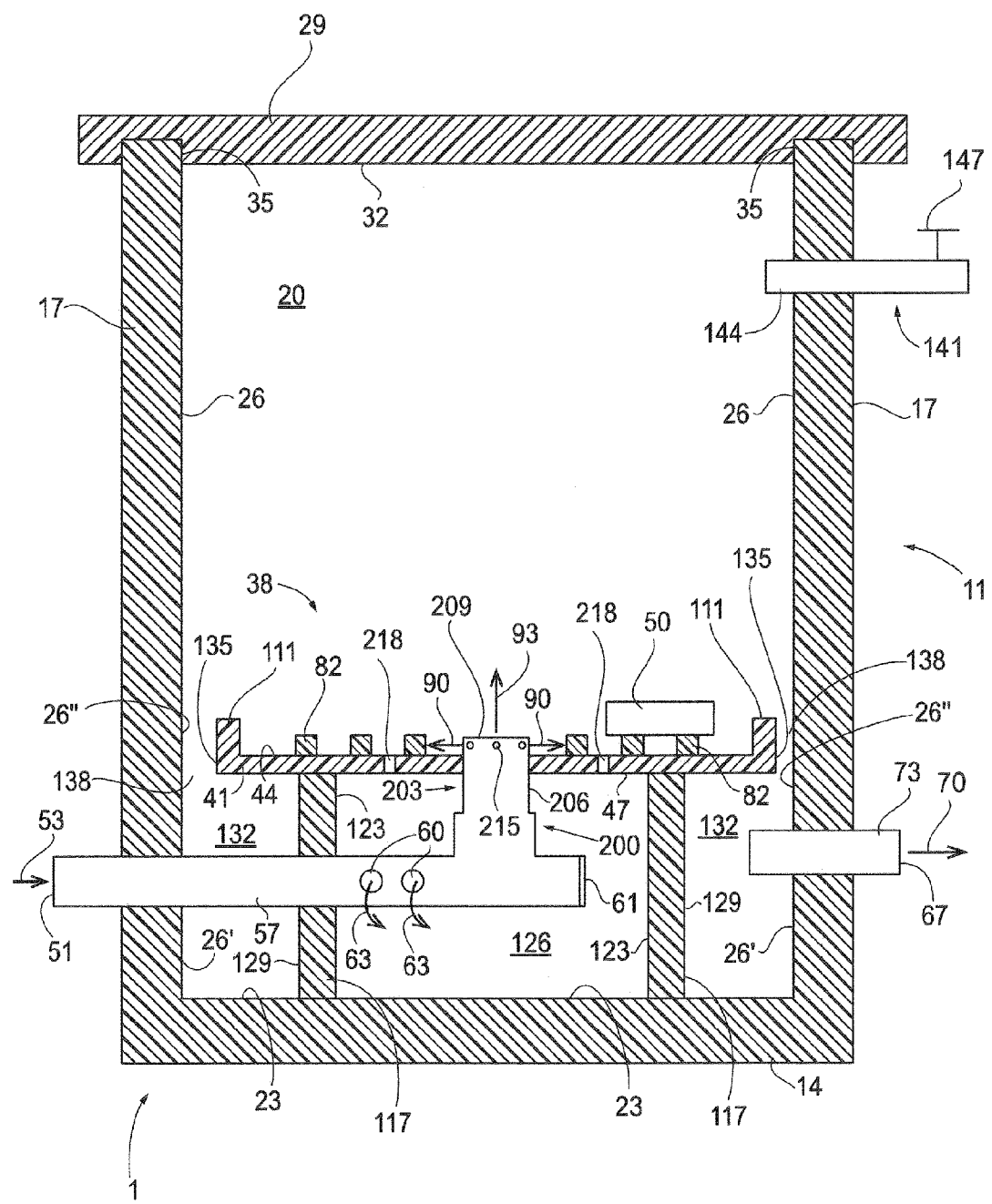
FIG. 5 is a representative side elevational partial sectional view of a chemical feeder in accordance with some embodiments of the present invention.

With reference to FIG. 5 of the drawings, there is depicted a chemical feeder 1 according to some embodiments of the present invention. Chemical feeder 1 includes a housing 11 that includes a housing base 14 and at least one housing sidewall 17 that extends upward from housing base 14. Housing base 14 and housing sidewall 17 together define a housing chamber 20 that resides within housing 11. More particularly, housing base 14 has an inner surface 23, and sidewall 17 have an inner surface 26. Inner surface 23 of housing base 14 and inner surface 26 of sidewall 17 together define housing chamber 20, with some embodiments.

The housing of the chemical feeder includes at least one housing sidewall, such as housing sidewall 17. As used herein the term "housing sidewall" includes singular and plural referents thereof. With some embodiments, housing sidewall 17 is a unitary sidewall (or unitary sidewall structure).

Housing 11, with some embodiments, is a substantially cylindrical housing. Housing 11 can, with some further embodiments, have other shapes including, but not limited to, spherical and multi-sided shapes, such as, square-tubular, recta-tubular, hexa-tubular and octa-tubular. With some embodiments, the shape of housing chamber 20 defined by interior surfaces 23 and 26 can be different than the external shape of housing sidewall 17 and housing base 14. For purposes of non-limiting illustration, the exterior shape of housing sidewall 17 can be square, and housing base 14 can be square or circular, while interior surfaces 23 and 26 define a substantially cylindrical housing chamber 20.

Housing base 14 is affixed to the bottom of housing sidewall 17. With some embodiments, housing base 14 is attached to the bottom of housing sidewall 17 by art-recognized reversibly closeable systems, such as, matching threaded sections and/or fasteners (not shown). In accordance with some further embodiments, housing base 14 is attached to housing sidewall 17 by a substantially permanent system, such as by adhesives and/or welds. With some embodiments, housing base 14 and housing sidewall 17 together form (or are) a unitary housing base-housing sidewall structure. Inner surface 23 of housing base 14 can define or have any suitable surface or shape, such as a sectional shape, including, but not limited to, a flat shape (as depicted in the drawings), polygonal shapes, elliptical shapes, and hemispherical shapes, in which the polygonal, elliptical, and hemispherical shapes can each further define convex shapes and concave shapes, and combinations of such shapes.

Housing 11, with some embodiments, has a closed top. With some further embodiments, the top of housing 11 is closed with a lid, which can be reversibly closeable. As shown, housing 11 has a lid 29 attached thereto. Lid 29 engages sealingly with the top of housing sidewall 17. Lid 29 can be attached to the top of housing sidewall 17 by art-recognized systems, which include, for example, bolts, clamps, and/or matching threaded sections (not shown). In FIG. 5, lid 29 includes an annular groove 35 in inner surface 32 thereof, into which is received the top of housing sidewall 17, so as to attach lid 29 to the top of housing sidewall 17. Annular groove 35, with some embodiments, includes a gasket, such as an annular gasket (not shown) that serves to provide a sealing fit between annular groove 35 and the top of sidewall 17. The interior surface 32 of lid 29 together with the interior surfaces 26 and 23 of housing sidewall 17 and housing base 14, also serve to define housing chamber 20, with some embodiments.

With further reference to FIG. 5, chemical feeder 1 also includes a support plate 38 that includes a base plate 41. Base plate 41 has an upper surface 44 and a lower surface 47. Support plate 38 resides within housing chamber 20 and is positioned above inner surface 23 of housing base 14. Support plate 38 is adapted to support a solid chemical material 50 above upper surface 44 of base plate 41. The solid chemical material 50 as depicted in FIG. 5 is in the form of a tablet, of which a single tablet is shown (for ease of depiction). With some embodiments, a plurality of tablets (not shown) are present in housing chamber 20 and supported by support plate 38. The solid chemical material can, with some embodiments, be in the form of granules, pellets, and/or tablets, provided that it is of a size that will not fall down through or otherwise clog one or more apertures or annular openings of or associated with the support plate. The solid chemical materials that can be used with the chemical feeders of the present invention are discussed in further detail herein.

The chemical feeders of the present invention can include any of the support plates according to various embodiments of the present invention. For purposes of non-limiting illustration, support plate 38 of chemical feeder 1 of FIG. 5 can be replaced with other support plates according to further embodiments of the present invention, such as, but not limited to, support plate 38' as described with reference to FIG. 2, support plate 150 as described with reference to FIGS. 3A and 3B, and support plate 165 as described with reference to FIGS. 4A and 4B, which are each described in further detail herein. For purposes of further non-limiting illustration, support plate 165 of chemical feeder 5 of FIG. 6 can be replaced with other support plates according to further embodiments of the present invention, such as, but not limited to, support plate 38 as described with reference to FIGS. 1A and 1B, support plate 38' as described with reference to FIG. 2, and support plate 150 as described with reference to FIGS. 3A and 3B, which are each described in further detail herein.

The support plate of the chemical feeders of the present invention can have any suitable shape, such as circular shapes, elliptical shapes, polygonal shapes (such as, triangular, rectangular, pentagonal, hexagonal, etc.), and combinations thereof. With some embodiments, and as depicted in the drawing figures, the support plate has a substantially circular shape.

Chemical feeder 1 further includes at least one inlet 51 in housing 11 through which liquid, as depicted with arrow 53, is introduced into housing 11, such as into housing chamber 20. Inlet 51 can, with some embodiments, be positioned in any appropriate position in housing 11. Inlet 51 is positioned below the support plate, such as support plate 38, with some embodiments. With some embodiments, the inlet is located in a sidewall of the housing. As depicted in FIG. 5, inlet 51 is positioned in sidewall 17, in accordance with some embodiments. With some embodiments, inlet 51 is in fluid communication with an inlet pipe 57 that extends underneath support plate 38.

Figure 1B:
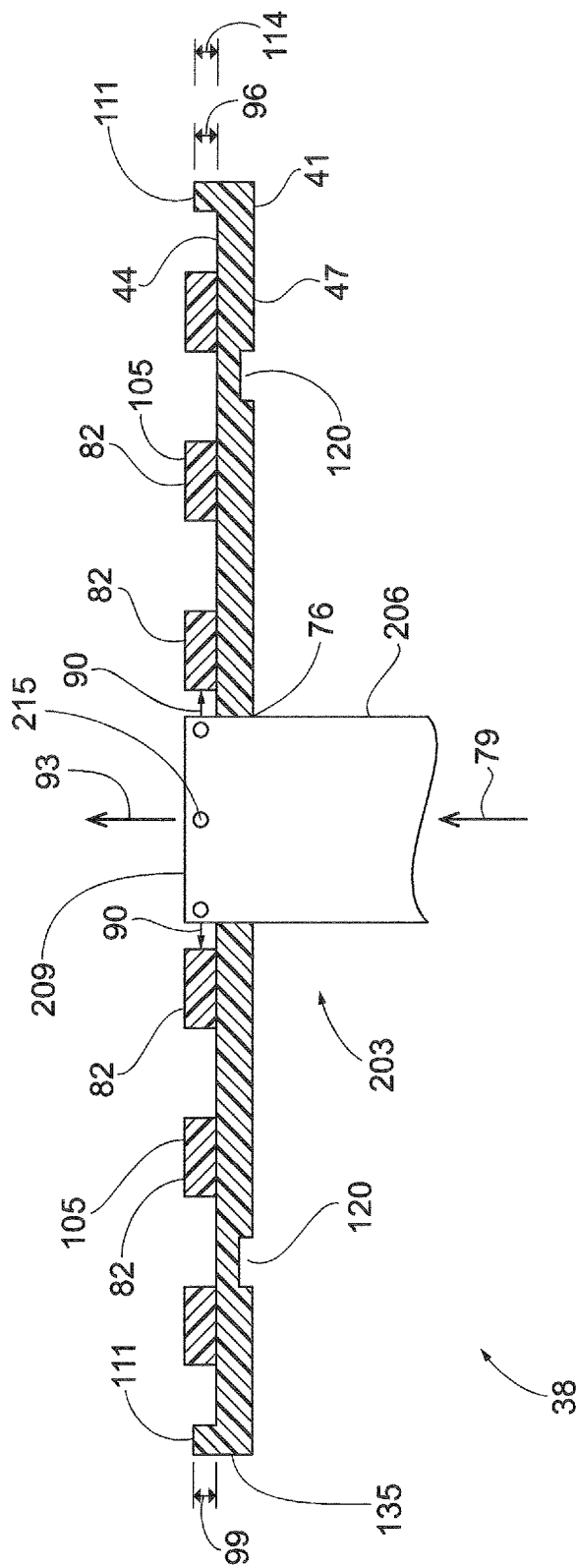
FIG. 1B is a representative side elevational partial sectional view of the support plate and distributor head of FIG. 1A.

Inlet pipe 57 includes, with some embodiments, a nozzle 200. With some embodiments, inlet pipe 57 provides fluid communication between inlet 51 and nozzle 200, such that nozzle 200 is in fluid communication with inlet 51. With reference to FIGS. 1A, 1B, and 5, nozzle 200 includes a distributor head 203. Distributor head 203 includes at least one distributor head sidewall 206 and a dome 209 having at least one dome hole 212. Dome 209 of distributor head 203 is attached to the top of distributor head sidewall 206 by art-recognized attachment means, such as, but not limited to, adhesives, fasteners, nuts and bolts combinations, clamps, an annular groove optionally including an annular gasket, and combinations thereof (not shown). The dome of the distributor head can have any suitable configuration and shape. With some embodiments, the dome of the distributor head is substantially flat (as depicted in the drawings). With some further embodiments, the dome of the distributor head can have a shape selected from polygonal shapes, arcuate shapes, and combinations thereof (not shown) that, with some embodiments, extends into housing chamber 20. With some embodiments, dome 209 is continuous with distributor head sidewall 206. Inlet pipe 57, with some embodiments, includes a terminal plug 61, as depicted.

The distributor head of the nozzle includes at least one distributor head sidewall, such as distributor head sidewall 206. As used herein the term "distributor head sidewall" includes singular and plural referents thereof. With some embodiments, distributor head sidewall 206 is a unitary sidewall (or unitary sidewall structure).

Chemical feeder 1 further includes at least one outlet 67 in housing 11 through which a treated liquid that includes dissolved and/or eroded chemical material is removed from housing 11 (such as from housing chamber 20), as indicated by arrow 70. The outlet (or outlets) can be located in any appropriate position in the housing, such as in a housing sidewall and/or in the housing base, with some embodiments. With some embodiments the outlet is located in a sidewall of the housing. As depicted in FIG. 5, outlet 67 is positioned in sidewall 17 of housing 11. With some further embodiments, outlet 67 is in fluid communication with an outlet pipe 73 that extends through sidewall 17.

In accordance with some embodiments, a liquid, such as an aqueous liquid, such as water, is introduced into inlet 51, passes through inlet pipe 57 and up through nozzle 200. The liquid, with some embodiments, and as described in further detail herein, passes through distributor head 203 and out through distributor head apertures 215 and dome hole(s) 212 into housing chamber 20 where it contacts a chemical material, such as chemical material 50. Contact between the introduced liquid and the chemical material results in the formation of a treated liquid that includes dissolved chemical material. The treated liquid is removed from housing 11 through outlet pipe 73 and outlet 67, with some embodiments.

With reference to FIGS. 1A, 1B, and 5, support plate 38 includes a support plate aperture 76 that extends from lower surface 47 to upper surface 44 of base plate 41. The dimensions and size of the support plate aperture are selected, which some embodiments, such that distributor head 203 (or a portion thereof) extends through support plate aperture 76. With some embodiments, distributor head 203 resides sealingly within support plate aperture 76. Sealing retainment (or receipt) of distributor head 203 within support plate aperture 76 is achieved, with some embodiments, by one or more gaskets that are positioned abuttingly and sealingly between sidewall 206 and the interior wall of support plate aperture 76 (not shown). With some embodiments, support plate aperture 76 has a diameter of from 2.54 cm to 12.7 cm (1 inch to 5 inches), or from 3.81 cm to 10.16 cm (1.5 inches to 4 inches), such as 7.62 cm (3 inches).

The support plates of the chemical feeders of the present invention include at least one support plate aperture, and with some embodiments include two or more support plate apertures. Each support plate aperture can be positioned at any location in the base plate of the support plate. When the support plate includes a plurality of support plate apertures, the support plate apertures can be distributed evenly and/or randomly in the base plate of the support plate. With some embodiments, the support plate includes one support plate aperture, which can be located (i) substantially centrally in the base plate (as depicted in the drawings), or (ii) at a position that is other than centrally located in the base plate. Each support plate aperture has a nozzle associated therewith and a distributor head that extends upward therethrough with some embodiments, as described in further detail herein.

Support plate 38 also includes a plurality of extensions 82 that extend upward from upper surface 44 of base plate 41. With some embodiments, each extension 82 is a peg extension. The peg extensions can also be referred to, with some embodiments, as stud extensions, pin extensions, and rod extensions.

Distributor head 203 of nozzle 200 extends through support plate aperture 76, and distributor head apertures 215 are each positioned above upper surface 44 of base plate 41 of support plate 38. During operation of chemical feeder 1, at least a portion of liquid introduced through inlet 51 passes through inlet pipe 57, up through nozzle 200, and correspondingly further up through and into distributor head 203, as indicated by arrow 79. Distributor head 203 distributes a first portion of liquid passing through the distributor head horizontally (or laterally) through distributor head apertures 215, as indicated by arrows 90. Distributor head 203 distributes a second portion of liquid passing through the distributor head vertically through dome hole(s) 212, as indicated by arrow 93. With some embodiments, the first portion of liquid (e.g., 90) and the second portion of liquid (e.g., 93) together account for substantially 100 percent of the liquid introduced into housing 11 through inlet 51. With some further embodiments, the first portion of liquid (e.g., 90) and the second portion of liquid (e.g., 93) together account for less than 100 percent of the liquid introduced into housing 11 through inlet 51. With some additional embodiments, the first portion of liquid is less than, substantially equal to, or greater than the second portion of liquid; and correspondingly the second portion of liquid is less than, substantially equal to, or greater than the first portion of liquid.

While not intending to be bound by any theory, it is believed that the horizontally (or laterally) deflected first portion of liquid 90 efficiently contacts the bottom or lower surfaces of the solid chemical material that resides and is supported above upper surface 44 of base plate 41, such as by extensions 82 with some embodiments. Such efficient contact of the first portion of liquid 90 with bottom/lower surfaces of the solid chemical material is believed, with some embodiments, to evenly, controllably, and reproducibly dissolve the solid chemical material supported there-above, which results in the formation of a treated liquid having a controllable and reproducible level of chemical material dissolved therein.

The dome of the distributor head includes one or more dome holes, which can be positioned anywhere in the dome, such as centrally located and non-centrally located. When the dome includes two or more dome holes, the dome holes can be positioned evenly and/or randomly in the dome. With some embodiments, the dome has a single dome hole, which can be positioned substantially centrally or non-centrally in the dome.

Each extension, with some embodiments, independently has an extension height above the upper surface of the base plate of the support plate, and the distributor head apertures reside below the extension height of each extension. With reference to FIG. 1B, each extension 82 has an extension height 96 above upper surface 44 of base plate 41 of support plate 38. As depicted in the drawing figures, such as FIG. 1B, each distributor head aperture 215 resides (or are positioned) below the extension height, such as 96, of each extension 82. Correspondingly, no distributor head aperture 215 resides above the extension height of the highest extension, with some embodiments. Further correspondingly, and with some embodiments, each distributor head aperture 215 resides (i) above upper surface 44 of base plate 41, and (ii) below the extension height 96 of each extension 82.

The extensions of the support plate can, with some embodiments, have extension heights that are the same or different relative to each other. With some further embodiments, each extension of a neighboring (or adjacent) pair of extensions have an extension height that is the same or different than the extension height of the neighboring (or adjacent) extension. With some additional embodiments, each extension height of each extension is substantially equivalent to each other, and correspondingly each extension height is the same.

With some embodiments, the dome of the distributor head has a dome height above the upper surface of the base plate of the support plate, and the dome height is greater than, or equal to, or less than the extension height of each extension of the support plate. With some further embodiments, the dome height is equal to or less than the extension height of each extension of the support plate. With reference to FIG. 1B, dome 209 of distributor head 203 has a dome height 99 above upper surface 44 of base plate 41 of support plate 38. As depicted in FIG. 1B, dome height 99 is substantially equivalent to extension height 96 of each extension 82, with some embodiments.

Each extension can, with some embodiments, independently have an upper surface that is concave, convex, or substantially flat. The concave and convex upper surfaces of each extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

Each extension, with some embodiments, has an upper surface that is a substantially flat surface. With reference to FIG. 1B, each extension 82 has an upper surface 105, and upper surface 105 is a substantially flat surface, as depicted.

The extensions, such as the peg extensions, of the support plate can each independently have any suitable shape. With some embodiments, each extension independently has a cross-sectional shape selected from circular shapes, ellipsoid shapes, polygonal shapes, and combinations of two or more thereof. The cross-sectional shape of the extensions, with some embodiments, is a lateral cross-sectional shape.

The extensions, such as peg extensions, of the support plate, can have any suitable spacing relative to each other and/or together define one or more patterns, provided, with some embodiments, the solid chemical material is controllably and reproducibly dissolved within the chemical feeder. The extensions can be evenly spaced from each other, randomly spaced from each other, or a combination thereof, with some embodiments. With some embodiments, the plurality of extensions, such as the peg extensions, are laterally spaced from each other. With some further embodiments, the extensions, such as the peg extensions, are substantially evenly spaced from each other. For purposes of nonlimiting illustration and in accordance with some embodiments, each extension 82 is evenly spaced from each neighboring (or adjacent) extension 82 by a distance of from 0.635 cm to 7.62 cm (0.25 inches to 3 inches), or from 1.27 cm to 5.08 cm (0.5 inches to 2 inches), or from 1.91 cm to 3.81 cm (0.75 inches to 1.5 inches), such as 2.54 cm (1 inch).

Figure 2:
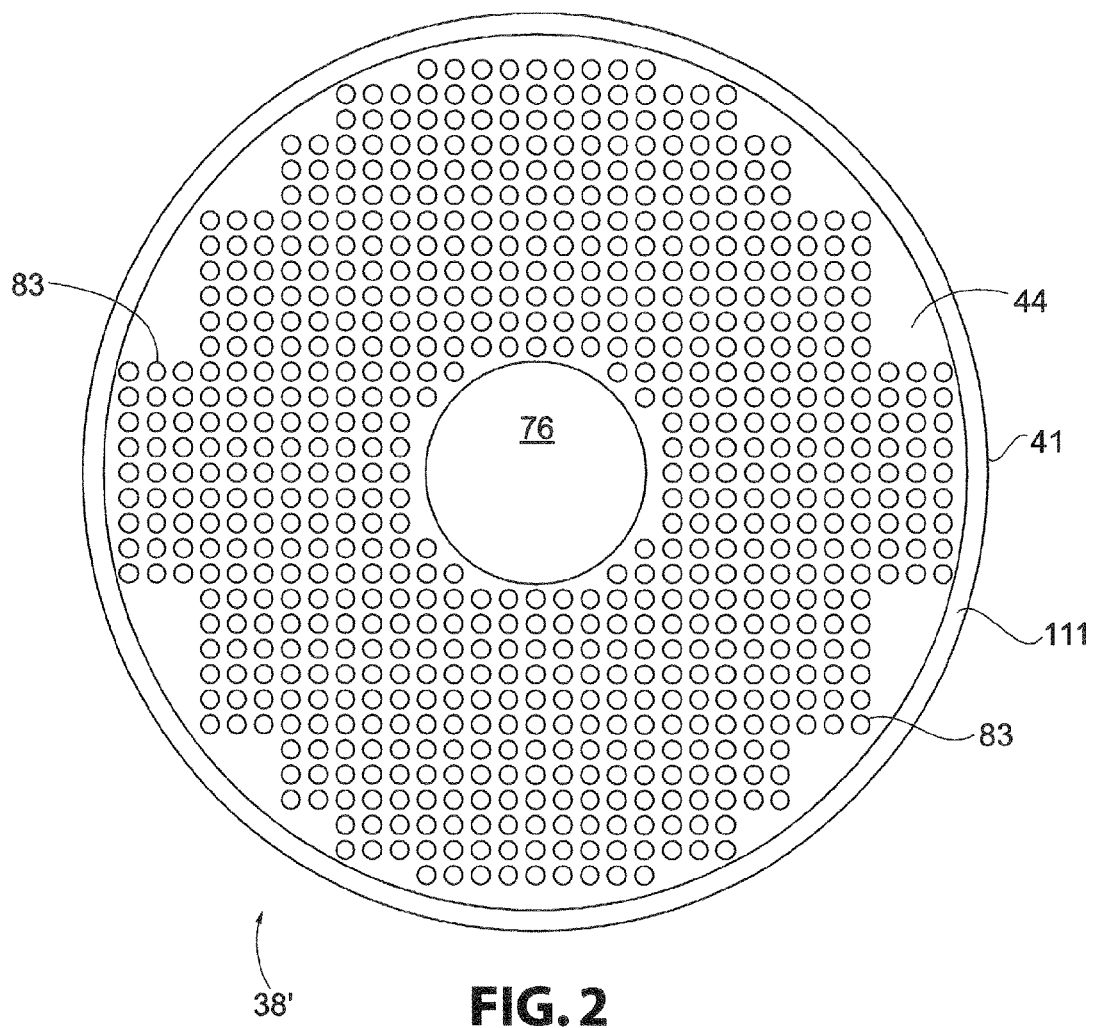
FIG. 2 is a representative top plan view of a support plate in accordance with some embodiments of the present invention, which has a plurality of peg extensions.

With reference to FIG. 2, support plate 38' includes a plurality of extensions 83 that have a substantially circular cross-sectional shape. With some embodiments, extensions 83 have a cross-sectional diameter of 0.318 cm (⅛ inch), and the center of each extension 83 is positioned 1.27 cm (0.5 inches) from the center of each neighboring extension 83.

With some embodiments, the plurality of extensions (or a portion of the plurality of extensions) support the solid chemical material above the upper surface of the base plate of the support plate. The extensions can, with some embodiments, directly and/or indirectly support the solid chemical material. Some of the solid chemical material, with some embodiments, is in direct contact with at least some of the extensions, and as such is directly supported by such extensions. Some of the solid chemical material, with some embodiments, is in direct contact with the dome of the distributor head of the nozzle, and is supported by the distributor head of the nozzle. With reference to FIG. 5, some of extensions 82 support tablet 50 above upper surface 44 of base plate 41 of support plate 38.

The base plates of the support plates of the chemical feeders of the present invention, with some embodiments, are free of apertures there-through outside of (or beyond) the outer edge of the support plate aperture. The base-plate, in accordance with some further embodiments, has one or more apertures there-through, which reside outside of (or beyond) the outer edge of the support plate aperture. With some embodiments, base plate 41 of support plate 38 includes one or more apertures 218 there-through which reside outside of (or beyond) the outer edge of support plate aperture 76 (see FIG. 5). Apertures 218 are not depicted in FIG. 1A or FIG. 1B. In accordance with some further embodiments, the base plate includes a plurality of pores (or micro-pores), and is a porous (or micro-porous) base plate. The pores of the base plate, with some embodiments, have diameters of from 0.01 mm to 10 mm (10 μm to 10,000 μm).

The base plate of the support plate, with some embodiments, has an outer rim that extends upward relative to the upper surface of the base plate. With reference to FIG. 1B, base plate 41 of support plate 38 has an outer rim 111 that extends upward relative to upper surface 44 of base plate 41. With some embodiments, and not intending to be bound by any theory, it is believed that the outer rim of the base plate serves to maintain a level of liquid above the upper surface of the base plate, so as to optimize contact of liquid moving across the base plate with the bottom or lower surfaces of the solid chemical material that resides and is supported thereabove.

The outer rim of the base plate can have any suitable height above the upper surface of the base plate. With some embodiments: each extension (or peg extension) independently has an extension height that is less than, equal to, or greater than the height of the outer rim.

Each extension, such as each peg extension, has an extension height above the upper surface of the base plate, the outer rim has an outer rim height above the upper surface of the base plate, and each extension height is equal to or less than the outer rim height, in accordance with some embodiments. With some further embodiments, each extension height is substantially equivalent to each other extension height, and each extension height is equal to or less than the outer rim height. With non-limiting reference to FIG. 1B and in accordance with some embodiments, each extension 82 has an extension height 96 above upper surface 44 of base plate 41, each extension height 96 is substantially equivalent to each other extension height 96, outer rim 111 has an outer rim height 114 above upper surface 44 of base plate 41, and each extension height 96 and the outer rim height 114 are substantially equivalent.

The support plates of the chemical feeders of the present invention can be fabricated by suitable methods. With some embodiments, the support plate is fabricated by: molding; by mechanical methods, such as with a computer numerical control (CNC) router; by gluing and/or welding; or any combination thereof. For purposes of non-limiting illustration, the extensions of the support plate can be formed: during molding of the support plate in a mold; with a CNC router that grinds away selected portions of the base plate so as to in effect lower the upper surface of the base plate while concurrently forming the extensions; by welding and/or gluing the extensions to the upper surface of the base plate; or any combination thereof.

The chemical feeder, with some embodiments, further includes at least one inner sidewall extending upward from the inner surface of the housing base, the support plate is supported by the inner sidewall, and the inner sidewall is spaced from the housing sidewall. With reference to FIG. 5, chemical feeder 1 includes inner sidewall 117 that extends upward from inner surface 23 of housing base 14. Support plate 38 is supported by inner sidewall 117. Inner sidewall 117 is spaced from, such as spaced inward from (or relative to) housing sidewall 17, such as spaced inward from inner surfaces 26 of sidewall 17.

As used herein the term "inner sidewall" includes singular and plural referents thereof. With some embodiments, inner sidewall 117 is a unitary sidewall (or unitary sidewall structure). With some further embodiments, inner sidewall 117 includes a plurality of inner sidewalls that are separate from each other.

With reference to FIG. 1B, and with some embodiments, lower surface 47 of base plate 41 includes an annular ring (or groove) 120 into which the top of inner sidewall 117 is received, for purposes of supporting base plate 41 of support plate 38.

An exterior surface of the inner sidewall and a portion of an inner surface of the housing sidewall together define an annular chamber, and the annular chamber is in fluid communication with the outlet in the housing, with some embodiments. With reference to FIG. 5, an exterior surface 129 of inner sidewall 117 and a portion 26' of inner surface 26 of housing sidewall 17 together define an annular chamber 132. Annular chamber 132 is in fluid communication with outlet 67 in housing 11. With further reference to FIG. 5, annular chamber 132 is in fluid communication with outlet pipe 73, which extends sealingly through housing sidewall 17, and which is in fluid communication with outlet 67.

The base plate of the support plate has a side surface, the side surface of the base plate and a further portion of the inner surface of the housing sidewall together define an annular opening that is in fluid communication with the annular chamber, with some embodiments. With reference to FIG. 5, base plate 41 of support plate 38 has a side surface 135. Side surface 135 of base plate 41 and a further portion 26" of inner surface 26 of housing sidewall 17 together define an annular opening 138 that is in fluid communication with annular chamber 132. Annular opening 138 is also in fluid communication with housing chamber 20.

With some embodiments, liquid is introduced into inlet 51, passes through inlet pipe 57, up through nozzle 200 and into distributor head 203, which distributes a first portion (90) horizontally out through distributor head apertures 215, and which distributes a second portion (96) vertically through dome hole(s) 212. The introduced and distributed liquid contacts the solid chemical material within housing chamber 20 and forms a treated liquid that includes dissolved and/or eroded chemical material. The treated liquid, with some embodiments, passes down through annular opening 138 and into annular chamber 132. From annular chamber 132, the treated liquid, with some embodiments, passes through outlet pipe 73 and outlet 67. From outlet 67, the treated liquid can be forwarded for use and/or for storage, as will be described in further detail herein.

In accordance with some embodiments, an inner surface of the inner sidewall and at least a portion of the lower surface of the base plate together define an inner chamber that resides below the support plate and within the housing chamber. With some further embodiments, the inner chamber is in fluid communication with the inlet in the housing. With reference to FIG. 5, an inner surface 123 of inner sidewall 117 and at least a portion of lower surface 47 of base plate 41 together define an inner chamber 126 that resides below support plate 38 and within housing chamber 20. Inner chamber 126 is in fluid communication with inlet 51 in housing 11, with some embodiments. With further reference to FIG. 5, and in accordance with some embodiments, inlet 51 is in fluid communication with inlet pipe 57, which extends sealingly through housing sidewall 17 and inner sidewall 117. Inlet pipe 57 has a plurality of inlet pipe apertures 60 that are in fluid communication with inner chamber 126, with some embodiments. At least some of inlet pipe apertures 60, with some embodiments, can be replaced with (or in fluid communication with) one or more inlet pipe nozzles (not shown in FIG. 5) that provide fluid communication between inlet 51 and inner chamber 126. A portion of the liquid introduced through inlet 51 passes through inlet pipe 57 and out through inlet pipe apertures 60 into inner chamber 126, as indicated by accurate arrows 63, with some embodiments. When the inner chamber is in fluid communication with the inlet, and in accordance with some embodiments, the base plate of the support plate includes one or more base plate apertures, such as base plate apertures 218. Liquid introduced into inner chamber 126 passes up through base plate apertures 218 and into housing chamber 20 where it can contact solid chemical material 50 and form a treated liquid that includes dissolved chemical material. The base plate apertures, such as base plate apertures 218, are oriented substantially vertical and/or are angled, such as described further herein with regard to the arcuate channel apertures and spiral channel apertures, with some embodiments.

With some embodiments, when the introduction of liquid into the chemical feeder is stopped, a vacuum can be formed within the housing chamber as liquid flows out through the outlet. The formation of a vacuum within the housing chamber can make it difficult to remove the lid from the housing and/or to drain residual liquid from the housing chamber. The chemical feeder, with some embodiments, includes a vacuum release apparatus, that allows the vacuum to be released from the housing chamber, which allows liquid to be drained from the housing chamber, and the lid to be removed, such as for purposes of inspecting and/or servicing the interior of the housing, and/or introducing fresh solid chemical material into the housing chamber. With some embodiments, the vacuum release apparatus is positioned vertically above the outlet of the chemical feeder. With reference to FIG. 5, chemical feeder 1 includes a vacuum release apparatus 141 that includes a vacuum release conduit 144 that extends through sidewall 17, and a valve 147 that extends into vacuum release conduit 144, which can be operated manually and/or mechanically. When valve 147 is opened, the exterior atmosphere, such as air, passes through vacuum release conduit 144 and into housing chamber 20 so as to release any vacuum formed therein, which allows liquid to drain out through outlet pipe 73 and outlet 67.

In accordance with some further embodiments, the engagement between lid 29 and the top of housing sidewalls 17 is a non-sealing engagement, and as such, when the introduction of liquid into the chemical feeder is stopped, a vacuum is not formed within the housing chamber as liquid flows out through the outlet.

The housing, with some embodiments, further includes a second housing base that is positioned below the housing base; the second housing base, the housing sidewall, and the housing base together define a lower housing chamber; the housing chamber is positioned above the lower housing chamber; the housing base includes at least one drain aperture that is in fluid communication with both of the annular chamber and the lower housing chamber; and the outlet is in fluid communication with the lower housing chamber. With some embodiments, the drain aperture(s) is in fluid communication with both of the housing chamber (such as housing chamber 20) and the lower housing chamber.

For purposes of non-limiting illustration and with reference to FIG. 6, chemical feeder 5 includes a housing 11, which further includes a second housing base 221, which is positioned below housing base 14. Sidewall 17 extends upward from second housing base 221. Second housing base 221, housing sidewall 17, and housing base 14 together define lower housing chamber 224. More particularly, and with some embodiments, inner surface 230 of second housing base 221, inner surface 26 of sidewall 17, and lower surface 15 of housing base 14 together define lower housing chamber 224. Housing chamber 20 is positioned above lower housing chamber 224, and correspondingly, lower housing chamber 224 is positioned below housing chamber 20. Housing chamber 20 and lower housing chamber 224 are separated from each other by housing base 14.

Figure 6:
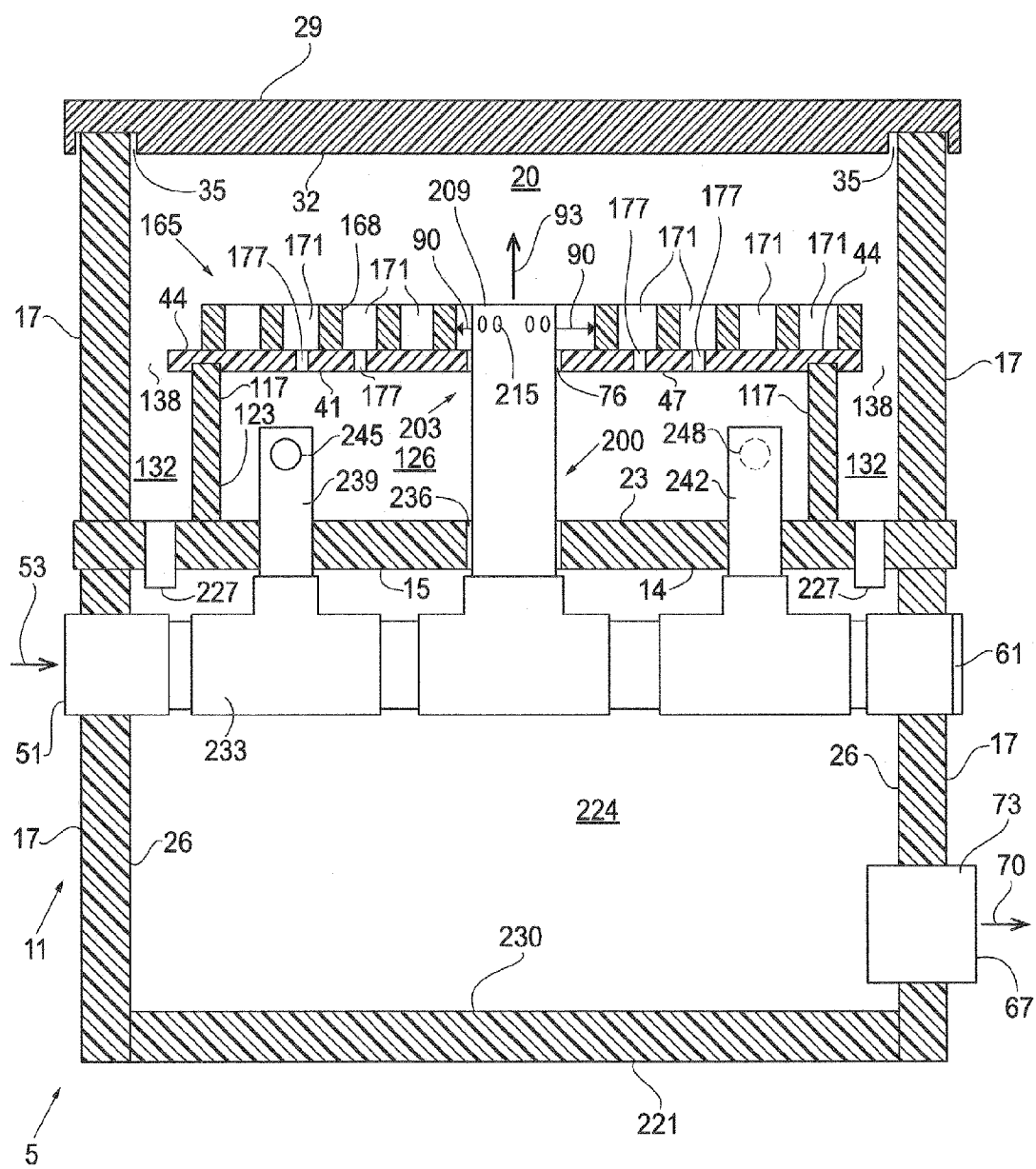
FIG. 6 is a representative side elevational partial sectional view of a chemical feeder in accordance with some embodiments of the present invention that includes a lower housing chamber.

With further reference to FIG. 6, and in accordance with some embodiments, housing base 14 of chemical feeder 5 includes drain apertures 227 that extend through housing base 14, and which are in fluid communication with both of (or provide fluid communication between) annular chamber 132 and lower housing chamber 224. Outlet 67 of housing 11 of chemical feeder 5 is in fluid communication with lower housing chamber 224.

Inlet 51 of chemical feeder 5 is in fluid communication with inlet pipe 233 which is positioned within lower housing chamber 224. With some embodiments, inlet pipe 233 can be positioned within housing chamber 20 and inner chamber 126 in accordance with the description of inlet pipe 57, as described previously herein. Inlet pipe 233 is in fluid communication with nozzle 200, which extends up through a housing base aperture 236 in housing base 14. With some embodiments, nozzle 200 engages sealingly with housing base aperture 236 in accordance with art-recognized sealing systems and methods. Inlet pipe 233, with some embodiments, includes a terminal plug 61. With some further embodiments, terminal plug 61 can be removed so as to provide inlet pipe 233 with a second inlet (not shown) through which liquid can be additionally introduced into housing 11.

As depicted in FIG. 6, chemical feeder 5 includes a support plate 165, which includes a spiral extension 168, as will be described in further detail herein. Nozzle 200 extends further through inner chamber 126, and distributor head 203 extends through support plate aperture 76 of base plate 41.

With some embodiments, and with further reference to FIG. 6, at least a portion of liquid introduced through inlet 51 of chemical feeder 5 passes through inlet pipe 233, up through nozzle 200 and into distributor head 203, which distributes a first portion (90) horizontally out through distributor head apertures 215, and which distributes a second portion (93) vertically through dome hole(s) 212. The introduced and distributed liquid contacts a solid chemical material within housing chamber 20 (not shown in FIG. 6) and forms a treated liquid that includes dissolved chemical material. The treated liquid, with some embodiments, passes down through annular opening 138 and into annular chamber 132. From annular chamber 132, the treated liquid, with some embodiments, passes through drain aperture(s) 227 and into lower chamber 224 of chemical feeder 5. The treated liquid then passes from lower chamber 224 through outlet pipe 73 and outlet 67. From outlet 67, the treated liquid can be forwarded for use and/or for storage, as will be described in further detail herein.

With further reference to chemical feeder 5 of FIG. 6, and with some embodiments, inlet pipe 233 further includes at least one inlet pipe nozzle that provides fluid communication between inlet 51 and inner chamber 126. With further reference to FIG. 6, and in accordance with some embodiments, inlet pipe 233 includes a first inlet pipe nozzle 239 and a second inlet pipe nozzle 242 that in each case extend sealingly up through housing base 14 and into inner chamber 126. First inlet pipe nozzle 239 includes at least one inlet pipe nozzle aperture 245, and second inlet pipe nozzle 242 includes at least one inlet pipe nozzle aperture 248.

With some embodiments, the inlet pipe nozzle apertures can be positioned so as to provide the liquid introduced into inner chamber 126 with a cyclonic motion. With further reference to FIG. 6, first inlet pipe nozzle 239 has a single inlet pipe nozzle aperture 245, and second inlet pipe nozzle 242 has a single inlet pipe nozzle aperture 248. Inlet pipe nozzle aperture 245 and inlet pipe nozzle aperture 248 are positioned relative to each other, with some embodiments, so as to provide liquid passing out there-through with a cyclonic motion within inner chamber 126. As depicted in FIG. 6, inlet pipe nozzle aperture 245 is positioned on a sidewall of first inlet pipe nozzle 239 so as to face out of the page, and inlet pipe nozzle aperture 248 is positioned on a sidewall of second inlet pipe nozzle 242 so as to face into the page, and correspondingly inlet pipe nozzle apertures 245 and 248 are positioned substantially 180° relative to each other, with some embodiments, and provide liquid passing out there-through with a cyclonic motion within inner chamber 126.

Figure 3A:
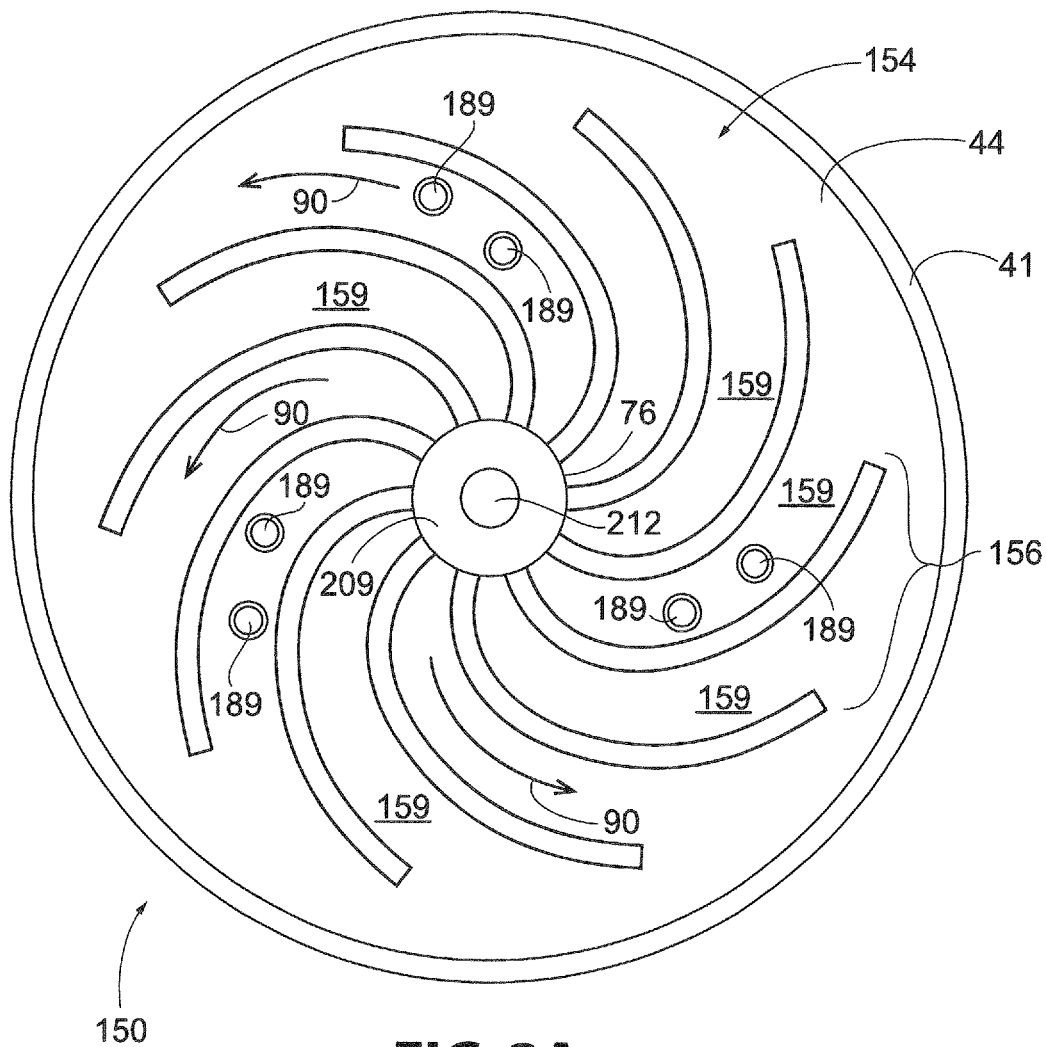
FIG. 3A is a representative top plan view of a support plate in accordance with some embodiments of the present invention, which has a plurality of arcuate extensions.
Figure 3B:
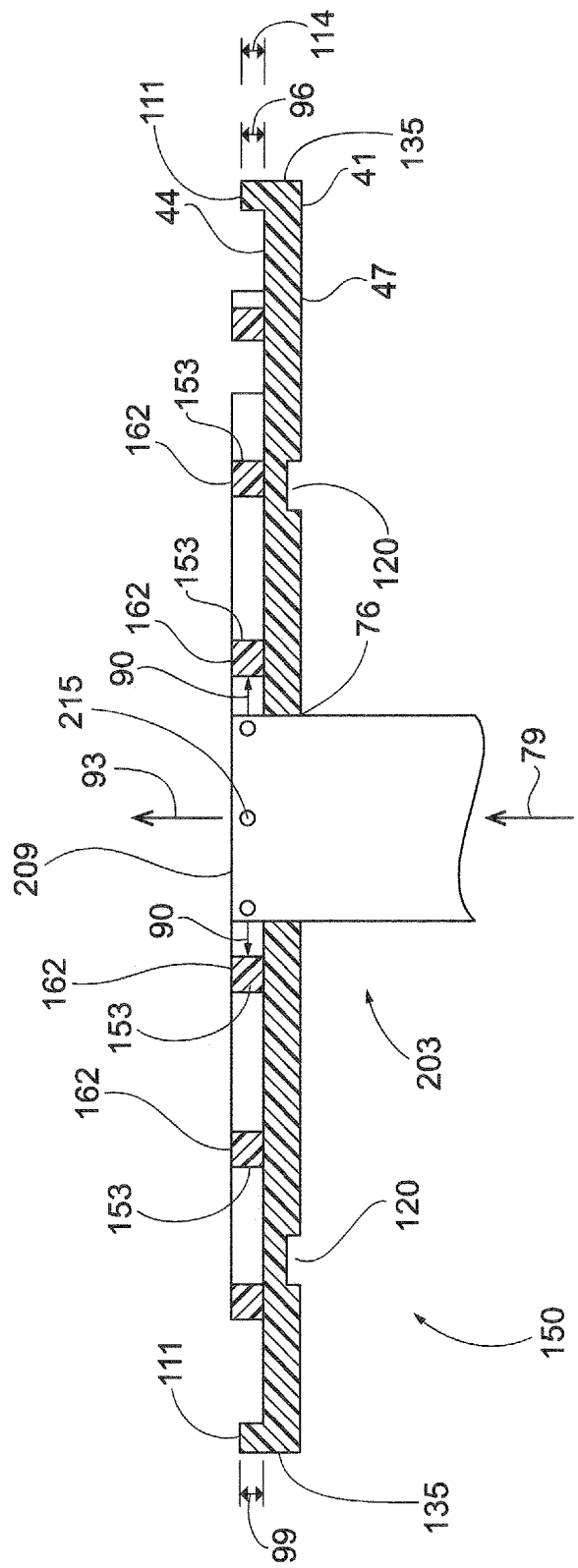
FIG. 3B is a representative side elevational partial sectional view of the support plate of FIG. 3A.

The support plate of the chemical feeder, with some embodiments, includes a plurality of arcuate extensions that extend upward from the upper surface of the base plate. With reference to FIG. 3A and FIG. 3B, support plate 150 includes a plurality of arcuate extensions 153 that extend upward from upper surface 44 of base plate 41 of support plate 150.

As described previously herein with reference to support plate 38, distributor head 203 of nozzle 200 extends up through support plate aperture 76. Liquid introduced into housing 11, such as through inlet 51, passes through inlet pipe 57 (or inlet pipe 233), up through nozzle 200 and into distributor head 203, which distributes a first portion (90) horizontally out through distributor head apertures 215 across upper surface 44 of base plate 41, and which distributes a second portion (93) vertically through dome hole(s) 212.

The plurality of arcuate extensions, with some embodiments, extend spirally outward relative to the support plate aperture, and together define an impeller pattern. With reference to FIG. 3A, arcuate extensions 153 extend spirally outward relative to (or from) support plate aperture 76, and together define an impeller pattern (or fan pattern) 154 as depicted.

With some embodiments, and in addition to together defining an impeller pattern, the plurality of arcuate extensions include a plurality of arcuate extension pairs, and each arcuate extension pair together defines an arcuate channel there-between. With some embodiments, each arcuate extension and a neighboring arcuate extension together form a pair of arcuate extensions, which together define an arcuate channel there-between. With reference to FIG. 3A, arcuate extensions 153 include pairs of arcuate extensions 156 that together define an arcuate channel 159 there-between.

With further reference to FIG. 3A, and in accordance with some embodiments, liquid passing up through nozzle 200 and into distributor head 203 is directed horizontally through distributor head apertures 215 (as indicated by arrows 90), and passes arcuately through the plurality of arcuate channels 159. Without intending to be bound by any theory, it is believed that passing through the arcuate channels 159 provides the liquid with a spiral or torsional pattern that moves up through and/or around the solid chemical material that is supported and resides above support plate 150.

The arcuate extensions each independently have an arcuate extension height above the upper surface of the base plate. With some embodiments, at least some arcuate extensions have an arcuate extension height that is substantially constant along the length of the arcuate extension. At least some arcuate extensions, with some additional embodiments, have an extension height that is variable along the length of the arcuate extension, such as (but not limited to) having an arcuate extension height that increases (such as, but not limited to, steadily) along the length of the arcuate extension, as the arcuate extension extends outward relative to (or from) the support plate aperture. With some additional embodiments, each arcuate extension height of each arcuate extension is substantially equivalent to each other, and correspondingly each arcuate extension height is the same.

Each arcuate extension, with some embodiments, independently has an arcuate extension height above the upper surface of the base plate of the support plate, and the distributor head apertures reside below the arcuate extension height of each arcuate extension. With reference to FIG. 3B, each arcuate extension 153 has an arcuate extension height 96 above upper surface 44 of base plate 41 of support plate 150. Each distributor head aperture 215 resides (or is positioned) below the arcuate extension height, such as 96, of each arcuate extension 153. Correspondingly, no distributor head aperture 215 resides above the arcuate extension height of the highest arcuate extension, with some embodiments. Further correspondingly, and with some embodiments, each distributor head aperture 215 resides: (i) above upper surface 44 of base plate 41; and (ii) below the arcuate extension height 96 of each arcuate extension 153.

In accordance with some embodiments and with further reference to FIG. 3B, each arcuate extension 153 has an arcuate extension height 96 above upper surface 44 of base plate 41 of support plate 150, and each arcuate extension height 96 is substantially equivalent to each other arcuate extension height 96. In addition, each distributor head aperture 215 resides (or is positioned) below the arcuate extension height 96 of each arcuate extension 153.

With some embodiments, the dome of the distributor head has a dome height above the upper surface of the base plate of the support plate, and the dome height is greater than, or equal to, or less than the arcuate extension height of each arcuate extension of the support plate. With some further embodiments, the dome height is equal to or less than the arcuate extension height of each arcuate extension of the support plate. With reference to FIG. 3B, dome 209 of distributor head 203 has a dome height 99 above upper surface 44 of base plate 41 of support plate 150. As depicted in FIG. 3B, and with some embodiments, dome height 99 is substantially equivalent to extension height 96 of each arcuate extension 153. Each dome hole of the dome of the distributor head, with some embodiments, independently has a dome hole height that is substantially equivalent to the dome height, and the dome height (such as dome height 99) as described above corresponds to (or is substantially equivalent to) the dome hole height of each dome hole.

Each arcuate extension can, with some embodiments, independently have an upper surface that is concave, convex, or substantially flat. The concave and convex upper surfaces of each arcuate extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

Each arcuate extension, with some embodiments, has an upper surface that is a substantially flat surface. With reference to FIG. 3B, each arcuate extension 153 has an upper surface 162, and upper surface 162 is a substantially flat surface, as depicted.

The arcuate extensions of the support plate can each independently have any suitable shape. With some embodiments, each arcuate extension independently has a cross-sectional shape selected from circular shapes, ellipsoid shapes, polygonal shapes, and combinations of two or more thereof. The cross-sectional shape of the arcuate extensions, with some embodiments, is a lateral cross-sectional shape.

With some embodiments, the plurality of arcuate extensions (or a portion of the plurality of arcuate extensions) support the solid chemical material above the upper surface of the base plate of the support plate. The arcuate extensions can, with some embodiments, directly and/or indirectly support the solid chemical material. Some of the solid chemical material, with some embodiments, is in direct contact with at least some of the arcuate extensions, and as such is directly supported by such arcuate extensions. Some of the solid chemical material, with some embodiments, is in direct contact with the dome of the distributor head of the nozzle, and is supported by the distributor head of the nozzle. The support of solid chemical material (such as tablet(s) 50) by the plurality of arcuate extensions above the upper surface of the base plate of the support plate is, with some embodiments, as described previously herein with reference to support plate 38 and FIG. 5, in which extensions 82 are substituted with arcuate extensions 153 (not shown).

The base plate of the support plate, with some embodiments, has an outer rim that extends upward relative to the upper surface of the base plate. With reference to FIG. 3B, base plate 41 of support plate 150 has an outer rim 111 that extends upward relative to upper surface 44 of base plate 41. With some embodiments, and not intending to be bound by any theory, it is believed that the outer rim of the base plate serves to maintain a level of liquid above the upper surface of the base plate, so as to optimize contact of liquid moving across the base plate with the bottom or lower surfaces of the solid chemical material that resides and is supported thereabove.

The outer rim of the base plate can have any suitable height above the upper surface of the base plate. With some embodiments: each arcuate extension independently has an arcuate extension height that is less than, equal to, or greater than the height of the outer rim.

Each arcuate extension has an arcuate extension height above the upper surface of the base plate, the outer rim has an outer rim height above the upper surface of the base plate, and each arcuate extension height is equal to or less than the outer rim height, in accordance with some embodiments. With some further embodiments, each arcuate extension height is substantially equivalent to each other arcuate extension height, and each arcuate extension height is equal to or less than the outer rim height. With non-limiting reference to FIG. 3B and in accordance with some embodiments, each arcuate extension 153 has an arcuate extension height 96 above upper surface 44 of base plate 41, each arcuate extension height 96 is substantially equivalent to each other arcuate extension height 96, outer rim 111 has an outer rim height 114 above upper surface 44 of base plate 41, and each arcuate extension height 96 and the outer rim height 114 are substantially equivalent.

The base plate, of the support plate which includes arcuate extensions, with some embodiments, further includes a plurality of arcuate channel apertures that reside in at least one arcuate channel, each arcuate channel aperture has an upper opening that is in fluid communication with the arcuate channel and a lower opening in the lower surface of the base plate, the upper opening is positioned downstream relative to the lower opening, and relative to a direction of flow of liquid through the arcuate channel.

Figure 8:
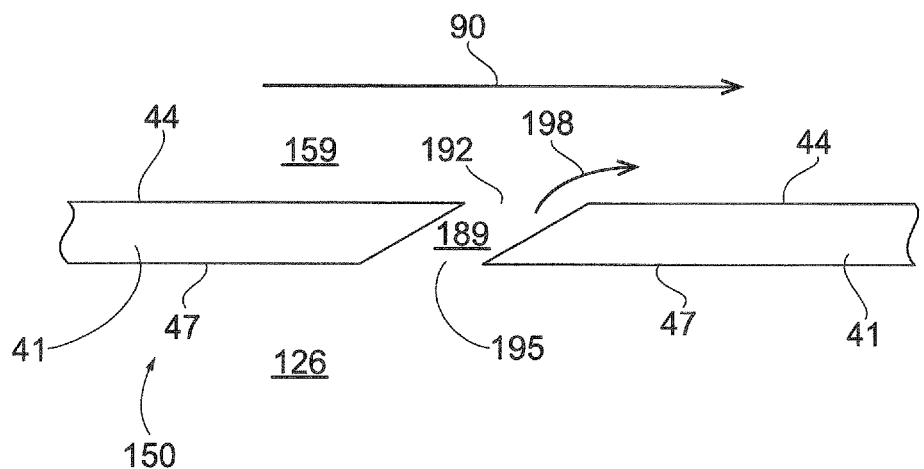
FIG. 8 is a representative side elevational sectional view of a base plate of a support plate according to some embodiments of the present invention, which has an arcuate channel aperture.

With reference to FIG. 3A and FIG. 8, base plate 41 of support plate 150 includes a plurality of arcuate channel apertures 189, which reside in (or within) at least some of the arcuate channels 159. With reference to FIG. 8, each arcuate channel aperture 189 has an upper opening 192 that is in fluid communication with arcuate channel 159, and a lower opening 195 that is positioned in lower surface 47 of base plate 41. Upper opening 192 is positioned downstream relative to lower opening 195, and in each case relative to the direction of flow of liquid through arcuate channel 159, as indicated by arrow 90. While not intending to be bound by any theory, it is believed that the relative positioning of the upper (192) and lower (195) openings of arcuate channel apertures 189, serves to provide liquid passing up there-through with a downstream vector as indicated by arrow 198. With some embodiments, it is believed that liquid passing up through the arcuate channel apertures 189 serves to further propel the horizontally deflected liquid (as indicated by arrows 90) that previously passed up through nozzle 200, into distributor head 203, out through distributor head apertures 215, and into arcuate channels 159.

The arcuate channel apertures can each independently have any suitable shape and dimensions. With some embodiments, the arcuate channel apertures are substantially cylindrical in shape, and each independently have a diameter of 0.25 cm to 1.9 cm (0.1 inches to 0.75 inches). With some further embodiments, the arcuate channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

As described previously herein with reference to FIGS. 5 and 6, the chemical feeder, with some embodiments, further includes at least one inner sidewall extending upward from the inner surface of the housing base, the support plate is supported by the inner sidewall, and the inner sidewall is spaced from the housing sidewall. In addition and as described previously herein with reference to FIGS. 5 and 6, an inner surface of the inner sidewall and at least a portion of the lower surface of the base plate together define an inner chamber that resides below the support plate and within the housing chamber. With some embodiments, the support plate includes a plurality of arcuate channel apertures that reside in at least one arcuate channel. When the chemical feeder includes an inner chamber, as described above and previously herein, the inner chamber is in fluid communication with both of: (i) the inlet in the housing; and (ii) each arcuate channel aperture, with some embodiments. As such, liquid introduced into the inner chamber (such as inner chamber 126) passes up through the arcuate channel apertures (such as, arcuate channel apertures 189) and into one or more arcuate channels 159 where the liquid can contact solid chemical material that is supported on the support plate. See FIG. 8.

Figure 7:
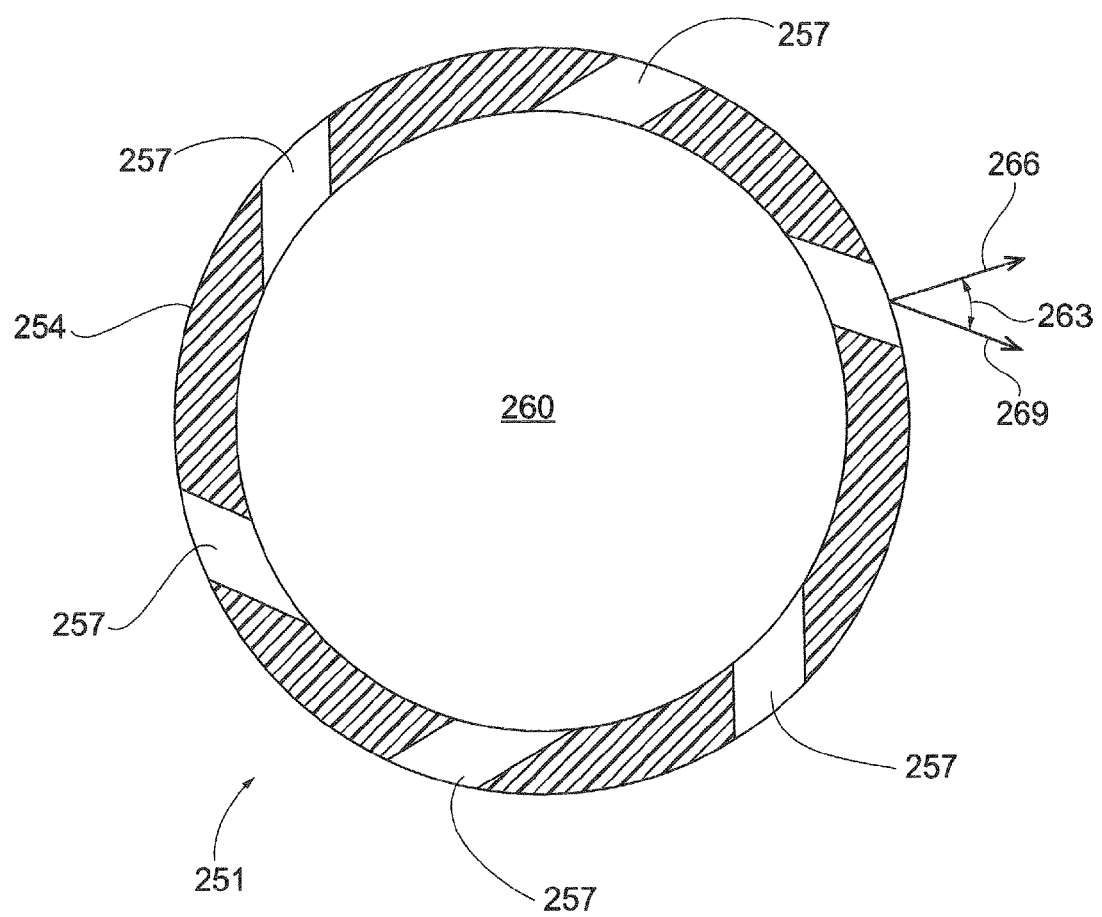
FIG. 7 is a representative top plan sectional view of a distributor head according to some embodiments of the present invention that includes tangential distributor head apertures.

The distributor head apertures, with some embodiments, are tangential distributor head apertures, and at least one tangential distributor head aperture is positioned to direct liquid tangentially into at least one arcuate channel. For purposes of non-limiting illustration and with reference to FIG. 7, distributor head 251 includes a plurality of tangential distributor head apertures 257 that extend through sidewall 254. Each tangential distributor head aperture is in fluid communication with the distributor head interior space 260. With some embodiments and as depicted in FIG. 7, the tangential distributor head apertures are aligned so as to provide liquid exiting from the distributor head with a torsional or cyclonic motion. As used herein, the term "tangential distributor head aperture(s)" means a distributor head aperture that has an alignment angle 263 of greater than 0° and less than 90°. The alignment angle 263 is determined as between a reference line 266 extending directly out from the surface of the distributor head sidewall and an alignment line 269 of tangential distributor head aperture. With some embodiments, when the distributor head has a substantially circular cross-section, reference line 266 corresponds to a radius line extending out from the center of the circular cross-section. Each tangential distributor head aperture independently has an alignment angle. With some embodiments, the alignment angles of at least two tangential distributor head apertures are different from each other. With some further embodiments, each alignment angle of each tangential distributor head aperture is the same.

Figure 4A:
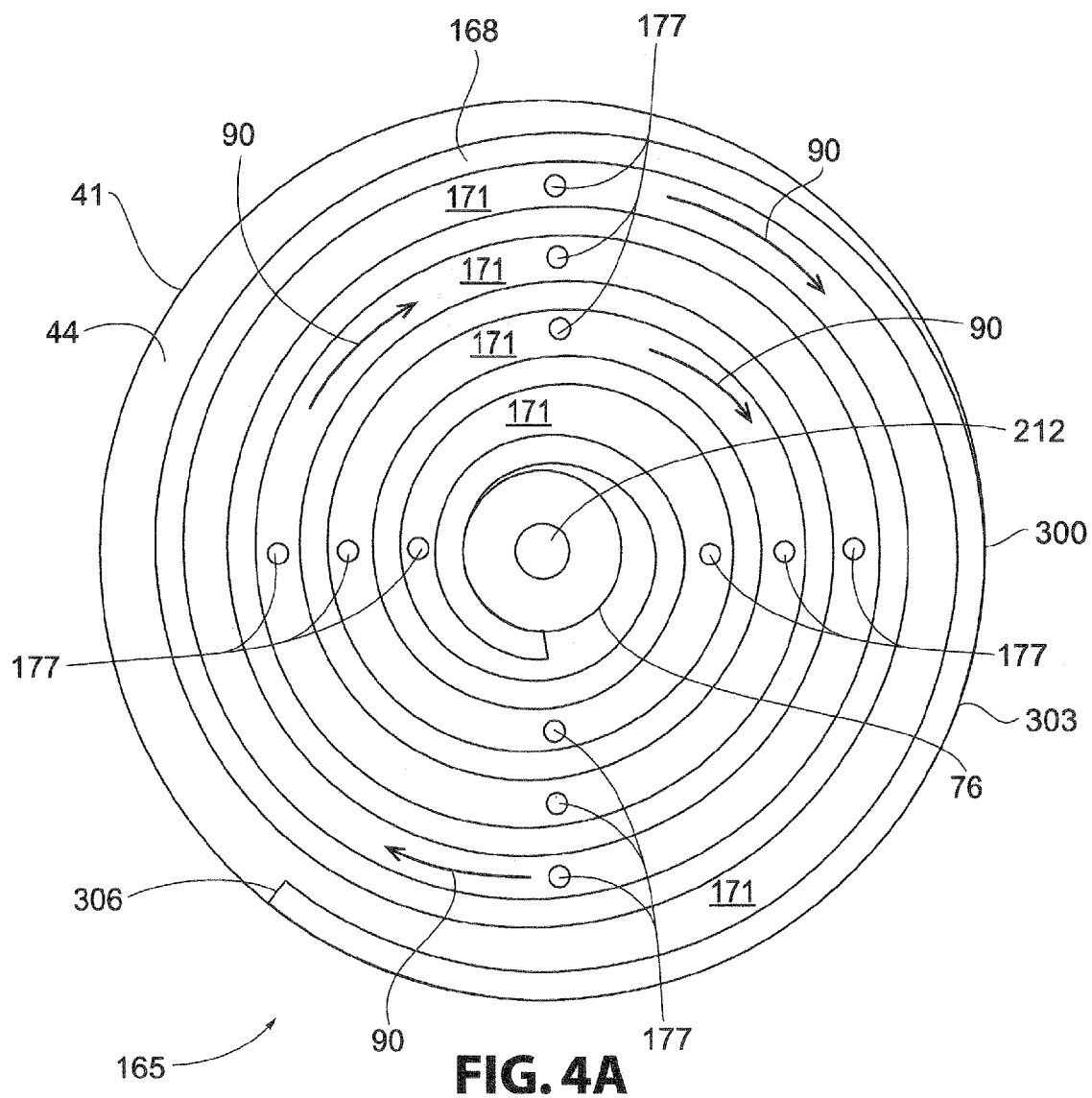
FIG. 4A is a representative top plan view of a support plate in accordance with some embodiments of the present invention, which has a spiral extension, and a distributor head extending upward through the support plate aperture thereof.
Figure 4B:
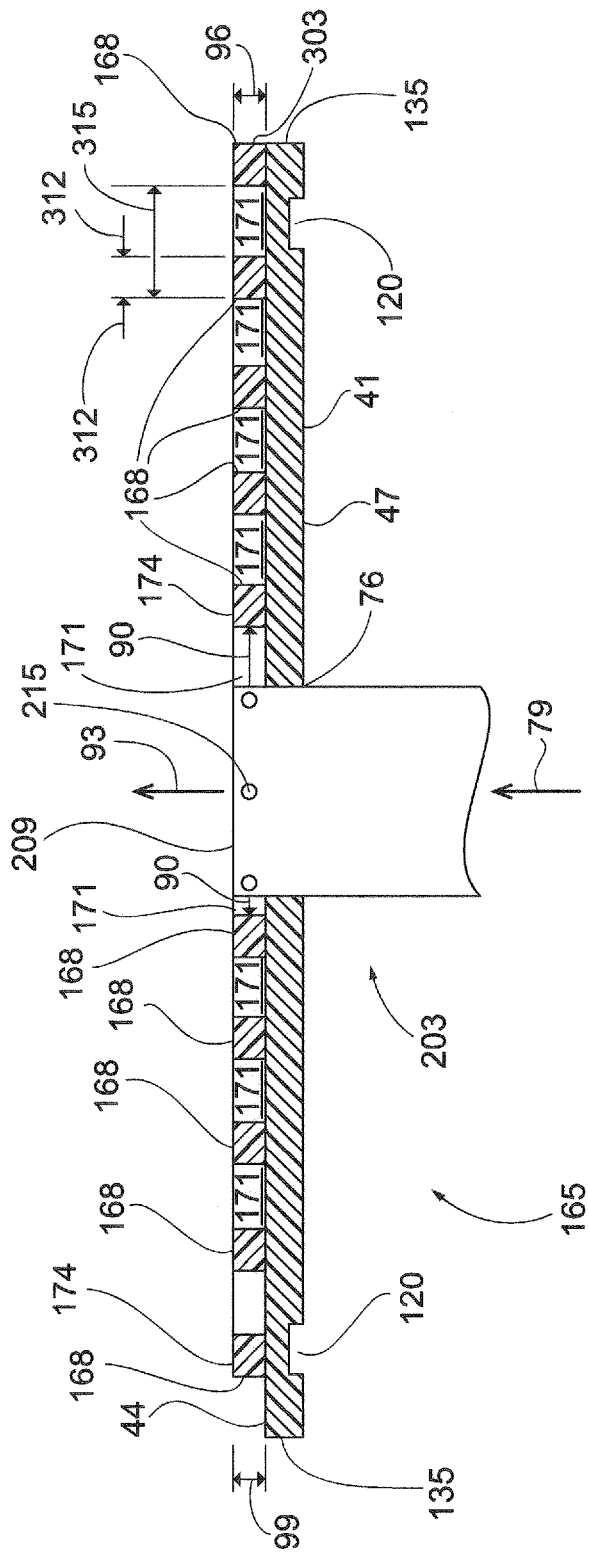
FIG. 4B is a representative side elevational partial sectional view of the support plate of FIG. 4A.

The support plate of the chemical feeder, with some embodiments, includes a spiral extension that extends upward from the upper surface of the base plate, the spiral extension extends spirally outward relative to (or from) the support plate aperture, and the spiral extension defines a spiral channel. With some embodiments, the support plate includes a single spiral extension. With reference to FIG. 4A and FIG. 4B, support plate 165 includes a spiral extension 168 that extends upward from upper surface 44 of base plate 41 of support plate 165. Spiral extension 168 extends spirally outward relative to (or from) support plate aperture 76 and correspondingly distributor head 203. In addition, spiral extension 168 defines a spiral channel 171.

As described previously herein with reference to support plate 38, distributor head 203 of nozzle 200 extends up through support plate aperture 76. Liquid introduced into housing 11, such as through inlet 51, passes through inlet pipe 57 (or inlet pipe 233), up through nozzle 200 and into distributor head 203, which distributes a first portion (90) horizontally out through distributor head apertures 215 across upper surface 44 of base plate 41, and which distributes a second portion (93) vertically through dome hole(s) 212.

With further reference to FIG. 4A, and in accordance with some embodiments, liquid passing up through nozzle 200 and into distributor head 203 is directed horizontally through distributor head apertures (as indicated by arrows 90) and passes spirally through spiral channel 171. Without intending to be bound by any theory, it is believed that passing through spiral channel 171 provides the liquid with a spiral or torsional pattern that increases the linear fluid velocity for a given volume of liquid, relative to the linear velocity for such volume of liquid moving in a linear/radial direction.

The spiral extension has a spiral extension height above the upper surface of the base plate. With some further embodiments, the spiral extension has a spiral extension height that is substantially constant along the length of the spiral extension. The spiral extension, with some additional embodiments, has a spiral extension height that is variable along the length of the spiral extension, such as (but not limited to) having a spiral extension height that increases (such as, but not limited to, steadily) along the length of the spiral extension, as the spiral extension extends spirally outward relative to (or from) the support plate aperture.

The spiral extension, with some embodiments, has a spiral extension height above the upper surface of the base plate of the support plate, and the distributor head apertures reside below the spiral extension height. With reference to FIG. 4B, spiral extension 168 has a spiral extension height 96 above upper surface 44 of base plate 41 of support plate 165. Each distributor head aperture 215 resides (or is positioned) below the spiral extension height 96. With some embodiments, when the spiral extension height is variable along the length of the spiral extension, each distributor head aperture resides below the lowest height of the spiral extension. Correspondingly, no distributor head aperture 215 resides above the highest spiral extension height, with some embodiments. Further correspondingly, and with some embodiments, each distributor head aperture 215 resides: (i) above upper surface 44 of base plate 41; and (ii) below the lowest spiral extension height 96 of spiral extension 168.

In accordance with some embodiments and with further reference to FIG. 4B, spiral extension 168 has a spiral extension height 96 above upper surface 44 of base plate 41 of support plate 165, and spiral extension height 96 is substantially constant along the length of spiral extension 168. In addition, each distributor head aperture 215 resides (or is positioned) below the spiral extension height 96 of spiral extension 168.

With some embodiments, the dome of the distributor head has a dome height above the upper surface of the base plate of the support plate, and the dome height is greater than, or equal to, or less than the spiral extension height of the spiral extension of the support plate. With some further embodiments, the dome height is equal to or less than the spiral extension height of the spiral extension of the support plate. With reference to FIG. 4B, dome 209 of distributor head 203 has a dome height 99 above upper surface 44 of base plate 41 of support plate 165. As depicted in FIG. 4B, and with some embodiments, dome height 99 is substantially equivalent to spiral extension height 96 of spiral extension 168. Each dome hole of the dome of the distributor head, with some embodiments, independently has a dome hole height that is substantially equivalent to the dome height, and the dome height (such as dome height 99) as described above corresponds to (or is substantially equivalent to) the dome hole height of each dome hole.

The spiral extension, with some embodiments, has a height of from 0.1 cm to 5.0 cm, or from 0.3 cm to 2.5 cm, or from 0.5 cm to 1.0 cm. In accordance with some embodiments, the spiral channel has an average width of from 0.2 cm to 8.0 cm, or from 0.5 cm to 5.0 cm, or from 1.2 cm to 2.6 cm. In accordance with some further embodiments, the width of the spiral channel is substantially constant along its length. The width of the spiral channel is, with some alternative embodiments, variable along its length. The terminal width of the spiral channel 171 at the terminus 306 of spiral extension 168 is less than the average width of the spiral channel, with some embodiments, such as from 5% to 80% less, or from 10% to 75% less or from 20% to 60% less than the average width of the spiral channel.

The spiral extension can, with some embodiments, have an upper surface that is concave, convex, or substantially flat. The concave and convex upper surfaces of the spiral extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

The spiral extension, with some embodiments, has an upper surface that is a substantially flat surface. With reference to FIG. 4B, spiral extension 168 has an upper surface 174, and upper surface 174 is a substantially flat surface, as depicted.

The spiral extension of the support plate can have any suitable shape. With some embodiments, the spiral extension has a cross-sectional shape selected from circular shapes, ellipsoid shapes, polygonal shapes, and combinations of two or more thereof. The cross-sectional shape of the spiral extension, with some embodiments, is a lateral cross-sectional shape.

With some embodiments, the spiral extension (or a portion of the spiral extension) supports the solid chemical material above the upper surface of the base plate of the support plate. The spiral extension can, with some embodiments, directly and/or indirectly support the solid chemical material. Some of the solid chemical material, with some embodiments, is in direct contact with at least a portion of the spiral extension, and as such is directly supported by such portion (or portions) of the spiral extension. Some of the solid chemical material, with some embodiments, is in direct contact with the dome of the distributor head of the nozzle, and is supported by the distributor head of the nozzle. The support of solid chemical material (such as tablet(s) 50) by the spiral extension above the upper surface of the base plate of the support plate is, with some embodiments, as described previously herein with reference to support plate 38 and FIG. 5, in which extensions 82 are substituted with spiral extension 168 (not shown).

The base plate, of the support plate which includes a spiral extension, with some embodiments, further includes a plurality of spiral channel apertures residing in the spiral channel, each spiral channel aperture having an upper opening that is in fluid communication with the spiral channel and a lower opening in the lower surface of the base plate, the upper opening is positioned downstream relative to the lower opening, and relative to a direction of flow of liquid through the spiral channel.

Figure 9:
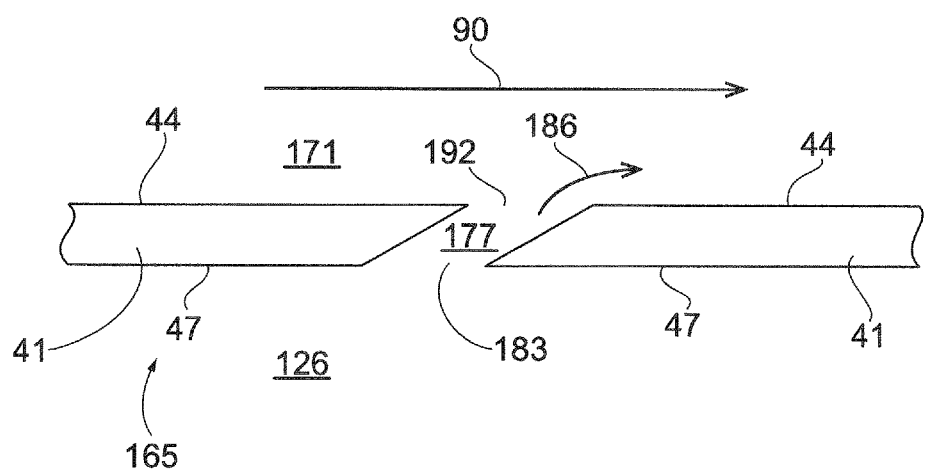
FIG. 9 is a representative side elevational sectional view of a base plate of a support plate according to some embodiments of the present invention, which has a spiral channel aperture.

With reference to FIG. 4A and FIG. 9, base plate 41 of support plate 165 includes a plurality of spiral channel apertures 177, which reside in (or within) spiral channel 171. With reference to FIG. 9, each spiral channel aperture 177 has an upper opening 180 that is in fluid communication with spiral channel 171, and a lower opening 183 that is positioned in lower surface 47 of base plate 41. Upper opening 180 is positioned downstream relative to lower opening 183, and in each case relative to the direction of flow of liquid through spiral channel 171, as indicated by arrow 90. While not intending to be bound by any theory, it is believed that the relative positioning of the upper (180) and lower (183) openings of spiral channel apertures 177, serves to provide liquid passing up therethrough with a downstream vector as indicated by arrow 186. With some embodiments, it is believed that liquid passing up through the spiral channel apertures 177 serves to further propel the horizontally directed liquid (as indicated by arrows 90) that previously passed up through nozzle 200, into distributor head 203, out through distributor head apertures 215, and into spiral channel 168.

The spiral channel apertures can each independently have any suitable shape and dimensions. With some embodiments, the spiral channel apertures are substantially cylindrical in shape, and each independently have a diameter of 0.25 cm to 1.9 cm (0.1 inches to 0.75 inches). With some further embodiments, the spiral channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

As described previously herein with reference to FIGS. 5 and 6, the chemical feeder, with some embodiments, further includes at least one inner sidewall extending upward from the inner surface of the housing base, the support plate is supported by the inner sidewall, and the inner sidewall is spaced from the housing sidewall. In addition and as described previously herein with reference to FIGS. 5 and 6, an inner surface of the inner sidewall and at least a portion of the lower surface of the base plate together define an inner chamber that resides below the support plate and within the housing chamber. With some embodiments, the support plate includes a plurality of spiral channel apertures that reside in the spiral channel. When the chemical feeder includes an inner chamber, as described above and previously herein, the inner chamber is in fluid communication with both of: (i) the inlet in the housing; and (ii) each spiral channel aperture, with some embodiments. As such, liquid introduced into the inner chamber (such as inner chamber 126) passes up through the spiral channel apertures (such as, spiral channel apertures 177) and into spiral channel 171 where the liquid can contact solid chemical material that is supported on the support plate. See FIG. 9.

The distributor head apertures, with some embodiments, are tangential distributor head apertures, and at least one tangential distributor head aperture is positioned to direct liquid tangentially into the spiral channel. The tangential distributor head apertures are as described previously herein with reference to distributor head 251 and tangential distributor head apertures 257 of FIG. 7.

Support plate 165, with some embodiments, is free of an outer rim as depicted in the drawings. With some further embodiments, support plate 165 has an outer rim (not depicted in FIGS. 4A and 4B), such as outer rim 111 as described previously herein with regard to support plates 38, 38', and 150.

With some embodiments, spiral extension 168 extends spirally outward to an alignment point 300 where the outer wall 303 of spiral extension 168 is substantially vertically aligned with side surface 135 of base plate 41. The terminus 306 of spiral extension 168 extends no further past alignment point 303, with some embodiments. In accordance with some further embodiments, terminus 306 of spiral extension 168 does extend past alignment point 300, with outer wall 303 and side surface 135 in continuing alignment (as depicted in FIG. 4A), such as through an angle of rotation that is greater than 0° and less than or equal to 180°, such as from 5° to 160°, or from 10° to 150°, or from 15° to 140° (when base plate 41 is substantially circular).

With some further embodiments, when terminus 306 of spiral extension 168 extends past alignment point 300 (with outer wall 303 and side surface 135 of base plate 41 in continuing alignment): (i) the width 312 of spiral extension 168 remains the same, and the width 315 of spiral channel 171 decreases past alignment point 300; or (ii) the width 312 of spiral extension 168 decreases (such as to a point) and the width 315 of spiral channel 171 remains substantially the same past alignment point 300. With some further embodiments, as the width 312 of spiral extension 168 remains the same past alignment point 300, terminus 306 of spiral extension 168 extends spirally past alignment point 300 until the width 315 of spiral channel 171 has decreased by 10%, or 15%, or 20%, or 25%, or 40%, or 50%, relative to the width of spiral channel 171 at alignment point 300. With some additional embodiments, as the width 312 of spiral extension 168 decreases past alignment point 300, the radius of inner wall 309 of spiral extension 168 increases past alignment point 300, and the radius of outer wall 303 remains substantially constant past alignment point 300, and correspondingly the width 312 of spiral extension 168 decreases past alignment point 300.

The chemical feeders of the present invention and the various components thereof, such as the support plate, nozzle, and distributor head, can each be independently fabricated from any suitable material or combination of materials that are chemically and corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride) or any other appropriate material(s) that is chemically resistant to the solid chemical being dispensed, such as a sanitizing agent, such as calcium hypochlorite. Other materials such as stainless steel can additionally or alternatively be used, but the use of such materials can be disadvantageous and undesirable, with some embodiments, for reasons including, for example, a significant increase in cost of the feeder and/or corrosion of such materials by the solid/dissolved chemical. With some embodiments, the chemical feeder, including the support plate, is fabricated from poly(vinyl chloride) (PVC), which is generally chemically resistant to water sanitizing chemicals, such as calcium hypochlorite. In accordance with some further embodiments of the present invention, at least a portion of the housing sidewall (such as housing sidewall 17) is fabricated from transparent PVC, which allows for visual inspection of the amount of solid chemical material present in housing chamber (such as housing chamber 20) without opening the housing. Plastic parts of the chemical feeder can be fabricated by art-recognized methods including, but not limited to, injection molding or rotational molding.

When constructed of plastic resin material, the various parts of the chemical feeder can, with some embodiments, be joined by solvent or heat welding or by threading. If a metal, such as stainless steel is used, conventional metal welding of the parts can be used to fabricate the chemical feeder. Alternatively, the various parts of the chemical feeder can be joined by conventional threaded bolts and appropriate gasketing to ensure that the chemical feeder is sealed, such as being liquid-tight, such as water-tight. Liquid inlet 51 and liquid outlet 67 can, with some embodiments, be joined to feed and removal conduits (not shown) by, for example, matched threaded sections, quick release fittings, plastic welding, and/or adhesives (not shown).

The various gaskets or seals, such as annular gaskets associated with the lid, used in the chemical feeder are, with some embodiments, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber, silicone rubber, and ethylene propylene diene monomer (EPDM) rubber; and fluorinated materials, such as fluorinated elastomers, such as VITON fluoroelastomer (commercially available from DuPont) homopolymers and copolymers of tetrafluoroethylene and chlorotrifluoroethylene, and copolymers of vinylidene fluoride and hexafluoropropylene.

The solid chemical material, or treating agent, used with the chemical feeders of the present invention can be any chemical that is solid at ambient (or standard) conditions of temperature and pressure (STP), and which is at least partially soluble in the liquid, such as water, that is introduced into the chemical feeder, at STP conditions. With some further embodiments, the solid chemical material is capable of being formed into pellets or tablets. The solid chemical material, with some further embodiments, is in the form of tablets that have a diameter which is greater than: (i) the diameter of the opening(s) in the base plate, such as support plate opening 76, base plate apertures 218, and channel apertures 177; and (ii) the width of the annular opening 138. Examples of such solid chemical materials, include, but are not limited to: sanitizing agents, such as chemicals that sanitize water, such as calcium hypochlorite, halogenated hydantoins (such as, 1-bromo-3-chloro-5,5-dimethylhydantoin and 1,3-dichloro-5,5-dimethylhydantoin), and chlorinated isocyanurates (such as trichloro-s-triazinetriones); dechlorination agents such as sodium sulfite, sodium metabisulfite, sodium bisulfite, sodium thiosulfate, sodium hydrosulfide (NaSH), sodium sulfide ($Na_2S$), and ascorbic acid; and pH control agents such as sodium bisulfate, citric acid, sodium carbonate, and sodium bicarbonate.

The chemical feeder of the present invention can, with some embodiments, be integrated into fluid, such as water, treatment operations by appropriate piping connected with inlet 51 and outlet 67. The chemical feeder can be integrated into, for example: a single pass system, such as an aqueous stream used to sanitize the surface of an article, such as vegetables, such as potatoes or surfaces used in the handling or processing of food; or a closed loop system, such as a swimming pool or hot tub. With some embodiments, the chemical feeder via inlet 51 and outlet 67, is connected directly (such as in-line) with the main fluid conduit used to recycle and treat fluid, such as water, from a stationary body of fluid, such as a swimming pool.

Various modifications can be made to the chemical feeder of the present invention without departing from the spirit and scope thereof. For purposes of non-limiting illustration, the solid chemical materials can be contained within the housing chamber in one or more canisters or baskets having a plurality of perforations therein, which allow for contact between the solid chemical material and liquid (or fluid) within the housing chamber. The use of canisters or baskets, with some embodiments, can be advantageous when it is desirable to minimize direct contact of the solid chemical with the person who is placing it into the chamber. When one or more canisters are used to place solid chemical material within the housing chamber of the chemical feeder, the housing and canister can be together keyed or otherwise adapted to only allow the insertion of a specifically designed canister into the housing chamber. Keying of the housing and canisters can be used as a method of preventing the addition of incompatible chemical materials to the chamber, such as calcium hypochlorite and chloroisocyanurates. For example and with non-limiting reference to FIG. 5, interior surface 26 of sidewall 17 of chemical feeder 1 can be provided with a vertically elongated raised rectangular member (not shown) that mates slidingly with a matching vertically elongated female slot in the side of a canister that is placed within housing chamber 20 (not shown). Such further non-limiting embodiments demonstrate that a wide variety of modifications can be made to the chemical feeder of the present invention without significantly affecting the operation thereof.

The present invention also relates to a method of treating, such as sanitizing, a body of liquid, such as a body of water, such as a swimming pool. The liquid treating method comprises: (a) providing a chemical feeder as described previously herein, wherein the housing chamber contains solid chemical material; (b) introducing, optionally under elevated pressure, a liquid stream (such as an aqueous stream) drawn from a body of liquid (such as a body of water) into the inlet of the chemical feeder; (c) removing a treated liquid stream (such as a treated aqueous stream) containing dissolved treating material (such as dissolved sanitizing material) from the outlet of the chemical feeder; and (d) introducing at least a portion of the treated liquid stream into the body of liquid. Steps (b) through (d) are performed continuously, with some embodiments.

With some embodiments of the method of the present invention, the inlet of the chemical feeder is connected directly in-line with a main water conduit used to handle water withdrawn from a body of water. In this configuration, the outlet of the pump used to recycle the water is in direct fluid communication (by way of a suitable conduit) with the inlet of the chemical feeder, in which case the chemical feeder is located on the pressure side of the recycle pump. The pressure of the liquid stream (such as an aqueous stream) introduced into the inlet of the chemical feeder can vary widely, and is with some embodiments from 5 pounds per square inch (psi) (34 kilopascals) to 15 psi (103 kilopascals), or from 5 psi to 10 psi (69 kilopascals). The flow rate of the liquid stream (such as an aqueous stream) through the chemical feeder can also vary widely, and is, with some embodiments, from 2 to 100 gallons per minute (7.6 to 379 liters per minute), or from 5 to 75 gallons per minute (19 to 284 liters per minute), or from 10 to 50 gallons per minute (38 to 189 liters per minute).

The present invention has been described with reference to specific details of particular embodiments thereof. It is not intended that such details be regarded as limitations upon the scope of the invention except insofar as and to the extent that they are included in the accompanying claims.

What is claimed is:

1. A chemical feeder comprising:
   (a) a housing having a housing base and at least one housing sidewall that together define a housing chamber within said housing;
   (b) a support plate comprising a base plate having an upper surface and a lower surface, said support plate residing within said housing chamber and being positioned above an inner surface of said housing base, said support plate being adapted to support a solid chemical material above said upper surface of said base plate, said support plate further comprising,
      (i) a support plate aperture extending from said lower surface to said upper surface of said base plate, and
      (ii) a plurality of extensions extending upward from said upper surface of said base plate, each extension being a peg extension,
   (c) at least one inlet in said housing through which liquid is introduced into said housing,
   (d) a nozzle that is in fluid communication with said inlet, said nozzle comprising a distributor head comprising at least one distributor head sidewall and a dome having at least one dome hole, said distributor head sidewall comprising a plurality of distributor head apertures; and
   (e) at least one outlet in said housing through which a treated liquid comprising dissolved chemical material is removed from said housing,
   wherein said distributor head extends through said support plate aperture, said distributor head apertures being positioned above said upper surface of said base plate, said distributor head distributing a first portion of liquid passing through said distributor head horizontally through said distributor head apertures, and said distributor head distributing a second portion of liquid passing through said distributor head vertically through said dome hole.

2. The chemical feeder of claim 1, wherein each extension has an extension height above said upper surface of said base plate of said support plate, and said distributor head apertures reside below the extension height of each extension.

3. The chemical feeder of claim 2, wherein each extension height is substantially equivalent to each other.

4. The chemical feeder of claim 1, wherein each extension has an upper surface that is a substantially flat surface.

5. The chemical feeder of claim 1, wherein each extension independently has a cross-sectional shape selected from circular shapes, ellipsoid shapes, polygonal shapes, and combinations of two or more thereof.

6. The chemical feeder of claim 1, wherein said plurality of extensions are laterally spaced from each other.

7. The chemical feeder of claim 1, wherein said plurality of extensions support said solid chemical material above said upper surface of said base plate of said support plate.

8. The chemical feeder of claim 1, wherein said base plate of said support plate has an outer rim that extends upward relative to said upper surface of said base plate.

9. The chemical feeder of claim 8, wherein each extension has an extension height above said upper surface of said base plate, said outer rim has an outer rim height above said upper surface of said base plate, and each extension height is equal to or less than said outer rim height.

10. The chemical feeder of claim 9, wherein each extension height is substantially equivalent to each other.

11. The chemical feeder of claim 1 further comprising at least one inner sidewall extending upward from said inner surface of said housing base, said support plate being supported by said inner sidewall, and said inner sidewall being spaced from said housing sidewall.

12. The chemical feeder of claim 11, wherein an exterior surface of said inner sidewall and a portion of an inner surface of said housing sidewall together define an annular chamber, said annular chamber being in fluid communication with said outlet in said housing.

13. The chemical feeder of claim 12, wherein said base plate of said support plate has a side surface, said side surface of said base plate and a further portion of said inner surface of said housing sidewall together define an annular opening that is in fluid communication with said annular chamber.

14. The chemical feeder of claim 13, wherein said housing further comprises a second housing base positioned below said housing base, said second housing base, said housing sidewall, and said housing base together defining a lower housing chamber, said housing chamber being positioned above said lower housing chamber, said housing base comprising at least one drain aperture that is in fluid communication with said annular chamber and said lower housing chamber, and said outlet is in fluid communication with said lower housing chamber.

15. A chemical feeder comprising:
(a) a housing having a housing base and at least one housing sidewall that together define a housing chamber within said housing;
(b) a support plate comprising a base plate having an upper surface and a lower surface, said support plate residing within said housing chamber and being positioned above an inner surface of said housing base, said support plate being adapted to support a solid chemical material above said upper surface of said base plate, said support plate further comprising,
  (i) a support plate aperture extending from said lower surface to said upper surface of said base plate, and
  (ii) a plurality of arcuate extensions extending upward from said upper surface of said base plate,
(c) at least one inlet in said housing through which liquid is introduced into said housing,
(d) a nozzle that is in fluid communication with said inlet, said nozzle comprising a distributor head comprising at least one distributor head sidewall and a dome having at least one dome hole, said distributor head sidewall comprising a plurality of distributor head apertures; and
(e) at least one outlet in said housing through which a treated liquid comprising dissolved chemical material is removed from said housing,
wherein said distributor head extends through said support plate aperture, said distributor head apertures being positioned above said upper surface of said base plate, said distributor head distributing a first portion of liquid passing through said distributor head horizontally through said distributor head apertures, and said distributor head distributing a second portion of liquid passing through said distributor head vertically through said dome hole.

16. The chemical feeder of claim 15, wherein said plurality of arcuate extensions extend spirally outward relative to said support plate aperture, and together define an impeller pattern.

17. The chemical feeder of claim 16, wherein said plurality of arcuate extensions comprise a plurality of arcuate extension pairs, and each arcuate extension pair together defines an arcuate channel there-between.

18. The chemical feeder of claim 17, wherein said base plate further comprises a plurality of arcuate channel apertures residing in at least one arcuate channel, each arcuate channel aperture having an upper opening being in fluid communication with said arcuate channel and a lower opening in said lower surface of said base plate, said upper opening being positioned downstream relative to said lower opening, and relative to a direction of flow of liquid through said arcuate channel.

19. The chemical feeder of claim 18, wherein said chemical feeder further comprises at least one inner sidewall extending upward from said inner surface of said housing base, said support plate being supported by said inner sidewall and said inner sidewall being spaced from said housing sidewall,
further wherein, an inner surface of said inner sidewall and at least a portion of said lower surface of said base plate together define an inner chamber that resides below said support plate and within said housing chamber, said inner chamber being in fluid communication with said inlet in said housing and each arcuate channel aperture.

20. The chemical feeder of claim 17, wherein said distributor head apertures are tangential distributor head apertures, and at least one tangential distributor head aperture is positioned to direct liquid tangentially into at least one arcuate channel.

21. The chemical feeder of claim 15, wherein each arcuate extension has an arcuate extension height above said upper surface of said base plate of said support plate, and said distributor head apertures reside below the arcuate extension height of each arcuate extension.

22. The chemical feeder of claim 21, wherein each arcuate extension height is substantially equivalent to each other.

23. The chemical feeder of claim 15, wherein each arcuate extension has an upper surface that is a substantially flat surface.

24. The chemical feeder of claim 15, wherein said plurality of arcuate extensions support said solid chemical material above said upper surface of said base plate of said support plate.

25. The chemical feeder of claim 15, wherein said base plate of said support plate has an outer rim that extends upward relative to said upper surface of said base plate.

26. The chemical feeder of claim 25, wherein each arcuate extension has an arcuate extension height above said upper surface of said base plate, said outer rim has an outer rim height above said upper surface of said base plate, and each arcuate extension height is equal to or less than said outer rim height.

27. The chemical feeder of claim 26, wherein each arcuate extension height is substantially equivalent to each other.

28. The chemical feeder of claim 15 further comprising at least one inner sidewall extending upward from said inner surface of said housing base, said support plate being supported by said inner sidewall, and said inner sidewall being spaced from said housing sidewall.

29. The chemical feeder of claim 28, wherein an exterior surface of said inner sidewall and a portion of an inner surface of said housing sidewall together define an annular chamber, said annular chamber being in fluid communication with said outlet in said housing.

30. The chemical feeder of claim 29, wherein said base plate of said support plate has a side surface, said side surface of said base plate and a further portion of said inner surface of said housing sidewall together define an annular opening that is in fluid communication with said annular chamber.

31. The chemical feeder of claim 30, wherein said housing further comprises a second housing base positioned below said housing base, said second housing base, said housing sidewall, and said housing base together defining a lower housing chamber, said housing chamber being positioned above said lower housing chamber, said housing base comprising at least one drain aperture that is in fluid communication with said annular chamber and said lower housing chamber, and said outlet is in fluid communication with said lower housing chamber.

32. A chemical feeder comprising:
(a) a housing having a housing base and at least one housing sidewall that together define a housing chamber within said housing;
(b) a support plate comprising a base plate having an upper surface and a lower surface, said support plate residing within said housing chamber and being positioned above an inner surface of said housing base, said support plate being adapted to support a solid chemical material above said upper surface of said base plate, said support plate further comprising,
   (i) a support plate aperture extending from said lower surface to said upper surface of said base plate, and
   (ii) a spiral extension extending upward from said upper surface of said base plate, said spiral extension extending spirally outward relative to said support plate aperture, and said spiral extension defining a spiral channel,
(c) at least one inlet in said housing through which liquid is introduced into said housing,
(d) a nozzle that is in fluid communication with said inlet, said nozzle comprising a distributor head comprising at least one distributor head sidewall and a dome having at least one dome hole, said distributor head sidewall comprising a plurality of distributor head apertures; and
(e) at least one outlet in said housing through which a treated liquid comprising dissolved chemical material is removed from said housing,
wherein said distributor head extends through said support plate aperture, said distributor head apertures being positioned above said upper surface of said base plate, said distributor head distributing a first portion of liquid passing through said distributor head horizontally through said distributor head apertures, and said distributor head distributing a second portion of liquid passing through said distributor head vertically through said dome hole.

33. The chemical feeder of claim 32, wherein said spiral extension has a spiral extension height above said upper surface of said base plate of said support plate, and said distributor head apertures reside below said spiral extension height.

34. The chemical feeder of claim 33, wherein said spiral extension has a length, and said spiral extension height is substantially constant along said length of said spiral extension.

35. The chemical feeder of claim 32, wherein said spiral extension has an upper surface that is a substantially flat surface.

36. The chemical feeder of claim 32, wherein said spiral extension supports said solid chemical material above said upper surface of said base plate of said support plate.

37. The chemical feeder of claim 32 further comprising at least one inner sidewall extending upward from said inner surface of said housing base, said support plate being supported by said inner sidewall, and said inner sidewall being spaced from said housing sidewall.

38. The chemical feeder of claim 37, wherein an exterior surface of said inner sidewall and a portion of an inner surface of said housing sidewall together define an annular chamber, said annular chamber being in fluid communication with said outlet in said housing.

39. The chemical feeder of claim 38, wherein said base plate of said support plate has a side surface, said side surface of said base plate and a further portion of said inner surface of said housing sidewall together define an annular opening that is in fluid communication with said annular chamber.

40. The chemical feeder of claim 39, wherein said housing further comprises a second housing base positioned below said housing base, said second housing base, said housing sidewall, and said housing base together defining a lower housing chamber, said housing chamber being positioned above said lower housing chamber, said housing base comprising at least one drain aperture that is in fluid communication with said annular chamber and said lower housing chamber, and said outlet is in fluid communication with said lower housing chamber.

41. The chemical feeder of claim 32, wherein said base plate further comprises a plurality of spiral channel apertures residing in said spiral channel, each spiral channel aperture having an upper opening being in fluid communication with said spiral channel and a lower opening in said lower surface of said base plate, said upper opening being positioned downstream relative to said lower opening, and relative to a direction of flow of liquid through said spiral channel.

42. The chemical feeder of claim 41, wherein said chemical feeder further comprises at least one inner sidewall extending upward from said inner surface of said housing base, said support plate being supported by said inner sidewall, and said inner sidewall being spaced from said housing sidewall,
   further wherein, an inner surface of said inner sidewall and at least a portion of said lower surface of said base plate together define an inner chamber that resides below said support plate and within said housing chamber, said inner chamber being in fluid communication with said inlet in said housing and each spiral channel aperture.

43. The chemical feeder of claim 32, wherein said distributor head apertures are tangential distributor head apertures, and at least one tangential distributor head aperture is positioned to direct liquid tangentially into said spiral channel.

* * * * *